United States Patent
Tonouchi

(10) Patent No.: US 9,021,304 B2
(45) Date of Patent: Apr. 28, 2015

(54) FAULT ANALYSIS RULE EXTRACTION DEVICE, FAULT ANALYSIS RULE EXTRACTION METHOD AND STORAGE MEDIUM

(75) Inventor: Toshio Tonouchi, Tokyo (JP)

(73) Assignee: NEC Corporation, Tokyo (JP)

( * ) Notice: Subject to any disclaimer, the term of this patent is extended or adjusted under 35 U.S.C. 154(b) by 284 days.

(21) Appl. No.: 13/634,185

(22) PCT Filed: Mar. 3, 2011

(86) PCT No.: PCT/JP2011/054896
§ 371 (c)(1),
(2), (4) Date: Nov. 2, 2012

(87) PCT Pub. No.: WO2011/111599
PCT Pub. Date: Sep. 15, 2011

(65) Prior Publication Data
US 2013/0042147 A1 Feb. 14, 2013

(30) Foreign Application Priority Data
Mar. 11, 2010 (JP) ................................ 2010-054539

(51) Int. Cl.
*G06F 11/00* (2006.01)
*G06F 11/07* (2006.01)
*G06F 11/30* (2006.01)

(52) U.S. Cl.
CPC .......... *G06F 11/079* (2013.01); *G06F 11/0781* (2013.01); *G06F 11/302* (2013.01); *G06F 11/3072* (2013.01)

(58) Field of Classification Search
USPC .................................................... 714/25, 26
See application file for complete search history.

(56) References Cited

U.S. PATENT DOCUMENTS

| | | | |
|---|---|---|---|
| 6,865,508 B2 * | 3/2005 | Ueki et al. .................... | 702/181 |
| 7,409,604 B2 * | 8/2008 | Murphy et al. ................. | 714/48 |
| 8,209,567 B2 * | 6/2012 | Cohen et al. ................... | 714/45 |
| 8,464,279 B2 * | 6/2013 | Gutjahr et al. ................ | 719/318 |
| 2005/0080806 A1* | 4/2005 | Doganata et al. ............. | 707/102 |
| 2010/0050260 A1* | 2/2010 | Nakakoji et al. ................ | 726/23 |
| 2010/0223499 A1* | 9/2010 | Panigrahy et al. .............. | 714/19 |

(Continued)

FOREIGN PATENT DOCUMENTS

| | | |
|---|---|---|
| JP | 2005-216148 A | 8/2005 |
| JP | 2009-245154 A | 10/2009 |

OTHER PUBLICATIONS

International Preliminary Report on Patentability issued on Oct. 2, 2012 in PCT/JP2011/054896.

(Continued)

*Primary Examiner* — Joshua P Lottich
(74) *Attorney, Agent, or Firm* — Sughrue Mion, PLLC

(57) ABSTRACT

The disclosed fault analysis rule extraction device includes: an event preprocessing section and a fault analysis rule extraction section. The event preprocessing section merges, with respect to event groups each of which is grouped every certain time period, event groups that can be presumed to occur from the same fault by a cluster analysis. The fault analysis rule extraction section extracts a fault analysis rule useful for a fault analysis by relating event logs to clusters. By the fault analysis rule extraction device of the above configuration, highly accurate fault analysis rule are automatically provided from the event logs of a system.

14 Claims, 20 Drawing Sheets

(56) References Cited

U.S. PATENT DOCUMENTS

2011/0154367 A1* 6/2011 Gutjahr et al. ............... 719/316
2011/0185234 A1* 7/2011 Cohen et al. .................... 714/37

OTHER PUBLICATIONS

International Preliminary Report on Patentability issued Oct. 2, 2012 by the International Searching Authority in counterpart International Application No. PCT/JP2011/054896.

Takai, "Event Sokan Kaiseki ni yoru Kokateki na Unten Kadai no Chushutsu to Unten Shien Kochiku", Keiso, Apr. 1, 2009, vol. 52, No. 4, pp. 49-53.

Yoshii, "Profile Generation for Intrusion Detection Using Data Mining Technique", Computer Security Symposium, Oct. 26, 2000, vol. 2000, No. 12, pp. 249-254.

\* cited by examiner

FIG. 5

| EVENT | OCCURRENCE TIME | OCCURRENCE PLACE | EVENT MESSAGE | EVENT CLASS |
|---|---|---|---|---|
| e1 | 2009/1/20 17:30 | jbila6 | syslogd 1.4.1: restart (remote reception). | syslog: restart |
| e2 | 2009/1/20 17:30 | jbila6 | 1/20 17:30:01 syslog: syslogd startup succeeded | syslog: syslogd startup succeeded |
| e3 | 2009/1/20 17:30 | jbila6 | kernel: klogd 1.4.1, log source = /proc/kmsg started. | kernel log |
| e4 | 2009/1/20 17:30 | jbila6 | 1/20 17:30:01 syslog: klogd startup succeeded | syslog: klogd startup succeeded |
| e5 | 2009/1/20 17:30 | jbila6 | 1/20 17:30:01 syslog: syslogd shutdown succeeded | syslog: syslogd shutdown succeeded |
| e6 | 2009/1/20 17:30 | jbila1 | CROND[25221]: (root) CMD (/usr/bin/mrtg /etc/mrtg/mrtg.cfg) | CROND |
| e7 | 2009/1/20 17:30 | jbila1 | CROND[25223]: (root) CMD (/usr/lib/sa/sa1 1 1) | CROND |
| e8 | 2009/1/20 17:30 | jbila1 | CROND[25225]: (mailman) CMD (/usr/bin/python -S /var/mailman/cron/gate_news) | CROND |
| e9 | 2009/1/20 17:35 | jbila7 | sshd[23586]: Accepted publickey for root from 192.168.32.6 port 33436 ssh2 | sshd: Accepted publickey |
| e10 | 2009/1/20 17:35 | jbila7 | sshd(pam_unix)[23586]: session opened for user root by (uid=0) | sshd: session opened |
| e11 | 2009/1/20 17:35 | jbila7 | sshd(pam_unix)[23586]: session closed for user root | sshd: session closed |
| e12 | 2009/1/20 17:35 | jbila7 | sshd[23595]: Accepted publickey for root from 192.168.32.6 port 33437 ssh2 | sshd: Accepted publickey |
| e13 | 2009/1/20 17:35 | jbila7 | sshd(pam_unix)[23595]: session opened for user root by (uid=0) | sshd: session opened |
| e14 | 2009/1/20 17:35 | jbila7 | INFO [mysql] 060120 17:34:47  /usr/sbin/mysqld: Normal shutdown | INFO [mysql] |
| e15 | 2009/1/20 17:35 | jbila7 | INFO [mysql] | INFO [mysql] |
| e16 | 2009/1/20 17:35 | jbila7 | INFO [mysql] 060120 17:34:47  InnoDB: Starting shutdown... | INFO [mysql] |
| e17 | 2009/1/20 17:35 | jbila7 | sshd[23595]: session closed for user root | sshd: session closed |
| e18 | 2009/1/20 17:35 | jbila7 | sshd[23626]: Accepted publickey for root from 192.168.32.6 port 33439 ssh2 | sshd: Accepted publickey |
| e19 | 2009/1/20 17:35 | jbila7 | sshd(pam_unix)[23626]: session opened for user root by (uid=0) | sshd: session opened |
| e20 | 2009/1/20 17:35 | jbila7 | sshd(pam_unix)[23626]: session closed for user root | sshd: session closed |
| e21 | 2009/1/20 17:35 | jbila7 | INFO [mysql] 060120 17:34:50  InnoDB: Shutdown completed | INFO [mysql] |

FIG. 6

SUB-EVENT GROUP

| EVENT OCCURRENCE TIME | IN-USE | caused by JBossResourceException | caused by jdbc.CommunicationException | caused by java.io.EOF Exception | child process still did not exit sending a SIGTERM | com.mysql.jdbc.Comm unicationsException | Could not create connection | CROND | | | ERROR [jboss] Query failed | exiting system | INFO [jboss] | INFO [mod-jk] |
|---|---|---|---|---|---|---|---|---|---|---|---|---|---|---|
| | | | | | | | | cups:cupsd shutdown succeeded | cups:cupsd shutdown succeeded | cups:cupsd startup succeeded | | | | |
| E1  2009/1/20 17:30 | | 0 | 0 | 0 | 0 | 0 | 3 | 0 | 0 | 0 | 0 | 0 | 0 | 0 |
| E3  2009/1/20 17:35 | | 0 | 0 | 0 | 0 | 0 | 2 | 0 | 0 | 0 | 0 | 0 | 0 | 8 |
| E5  2009/1/20 17:40 | | 0 | 0 | 0 | 0 | 0 | 3 | 0 | 1 | 0 | 3 | 0 | 21 | 0 |
| E6  2009/1/20 17:44 | | 0 | 0 | 1 | 0 | 1 | 0 | 0 | 0 | 0 | 0 | 0 | 0 | 0 |
| E8  2009/1/20 17:45 | | 1 | 0 | 0 | 0 | 0 | 2 | 0 | 0 | 0 | 3 | 0 | 4 | 0 |
| E9  2009/1/20 17:49 | | 1 | 0 | 0 | 0 | 0 | 0 | 1 | 1 | 0 | 3 | 0 | 0 | 0 |
| E11 2009/1/20 17:50 | | 1 | 0 | 0 | 0 | 0 | 1 | 0 | 1 | 0 | 4 | 0 | 17 | 0 |
| E12 2009/1/20 17:55 | | 0 | 0 | 0 | 0 | 0 | 2 | 0 | 0 | 0 | 0 | 0 | 0 | 5 |
| E13 2009/1/20 18:00 | | 0 | 0 | 0 | 0 | 0 | 3 | 0 | 0 | 0 | 0 | 0 | 0 | 0 |
| E15 2009/1/20 18:01 | | 0 | 0 | 0 | 0 | 0 | 5 | 0 | 0 | 0 | 0 | 0 | 0 | 0 |
| E17 2009/1/20 18:05 | | 0 | 0 | 4 | 0 | 0 | 2 | 0 | 0 | 0 | 0 | 0 | 0 | 0 |
| E18 2009/1/20 18:10 | | 0 | 0 | 0 | 0 | 0 | 2 | 0 | 0 | 0 | 0 | 0 | 0 | 0 |
| E19 2009/1/20 18:15 | | 0 | 2 | 0 | 0 | 0 | 3 | 0 | 0 | 0 | 0 | 0 | 0 | 0 |
| E20 2009/1/20 18:20 | | 0 | 0 | 0 | 0 | 0 | 2 | 0 | 0 | 0 | 0 | 0 | 0 | 0 |
| E22 2009/1/20 18:25 | | 0 | 0 | 0 | 0 | 0 | 3 | 0 | 0 | 0 | 0 | 0 | 0 | 0 |
| E23 2009/1/20 18:30 | | 0 | 0 | 0 | 0 | 0 | 2 | 0 | 0 | 0 | 0 | 0 | 0 | 0 |
| E25 2009/1/20 18:35 | | 0 | 0 | 0 | 0 | 0 | 2 | 0 | 0 | 0 | 0 | 0 | 0 | 0 |
| E27 2009/1/20 18:40 | | 0 | 0 | 0 | 0 | 0 | 3 | 0 | 0 | 0 | 0 | 0 | 0 | 0 |
| E29 2009/1/20 18:45 | | 0 | 0 | 0 | 0 | 0 | 2 | 0 | 0 | 0 | 28 | 0 | 68 | 0 |
| E30 2009/1/20 18:50 | | 0 | 0 | 0 | 0 | 0 | 3 | 0 | 0 | 0 | 4 | 0 | 168 | 0 |
| E32 2009/1/20 18:55 | | 0 | 0 | 0 | 0 | 0 | 2 | 0 | 0 | 0 | 4 | 0 | 166 | 0 |
| E33 2009/1/20 19:00 | | 0 | 0 | 0 | 0 | 0 | 3 | 0 | 0 | 0 | 18 | 0 | 0 | 0 |
| E35 2009/1/20 19:01 | | 0 | 0 | 0 | 0 | 0 | 5 | 0 | 0 | 0 | 68 | 0 | 0 | 0 |
| E37 2009/1/20 19:02 | | 0 | 0 | 0 | 0 | 0 | 2 | 0 | 0 | 0 | 7 | 0 | 0 | 0 |
| E39 2009/1/20 19:05 | | 0 | 0 | 0 | 0 | 0 | 3 | 0 | 0 | 0 | 0 | 0 | 0 | 0 |
| E40 2009/1/20 19:10 | | 0 | 0 | 0 | 0 | 0 | 2 | 0 | 0 | 0 | 0 | 0 | 0 | 0 |
| E41 2009/1/20 19:15 | | 0 | 0 | 0 | 0 | 0 | 3 | 0 | 0 | 0 | 0 | 0 | 0 | 8 |
| E43 2009/1/20 19:20 | | 0 | 0 | 0 | 0 | 0 | 2 | 0 | 1 | 0 | 3 | 0 | 141 | 0 |
| E45 2009/1/20 19:25 | | 1 | 0 | 0 | 0 | 0 | 3 | 0 | 1 | 0 | 3 | 0 | 42 | 0 |
| E47 2009/1/20 19:30 | | 1 | 0 | 0 | 0 | 0 | 2 | 0 | 0 | 0 | 3 | 0 | 23 | 0 |
| E48 2009/1/20 19:35 | | 0 | 0 | 0 | 0 | 0 | 3 | 0 | 0 | 0 | 0 | 0 | 0 | 0 |
| E49 2009/1/20 19:40 | | 0 | 0 | 0 | 0 | 0 | 2 | 0 | 0 | 0 | 0 | 0 | 0 | 5 |
| E50 2009/1/20 19:45 | | 0 | 0 | 0 | 0 | 0 | 2 | 0 | 0 | 0 | 0 | 0 | 0 | 0 |

FIG. 8

| | E1 | E3 | E5 | E6 | E8 | E9 | E11 | E12 | E13 | E15 | E17 | E18 | E20 | E22 | E23 | E25 | E27 | E29 | E30 |
|---|---|---|---|---|---|---|---|---|---|---|---|---|---|---|---|---|---|---|---|
| E1 | | 0.84 | 0.89 | 1.00 | 0.77 | 1.00 | 0.96 | 0.20 | 0.69 | 0.20 | 0.77 | 0.60 | 0.71 | 0.60 | 0.20 | 0.60 | 0.94 | 0.96 | 0.99 |
| E3 | 0.84 | | 0.85 | 1.00 | 0.61 | 1.00 | 0.84 | 0.79 | 0.04 | 0.79 | 0.54 | 0.44 | 0.43 | 0.44 | 0.79 | 0.44 | 0.92 | 0.95 | 0.98 |
| E5 | 0.89 | 0.85 | | 0.98 | 0.27 | 1.00 | 0.02 | 0.86 | 0.79 | 0.86 | 0.79 | 0.73 | 0.73 | 0.73 | 0.86 | 0.73 | 0.83 | 0.03 | 0.04 |
| E6 | 1.00 | 0.00 | 0.98 | | 0.95 | 1.00 | 0.98 | 1.00 | 1.00 | 1.00 | 1.00 | 1.00 | 1.00 | 1.00 | 1.00 | 1.00 | 1.00 | 1.00 | 1.00 |
| E8 | 0.77 | 0.61 | 0.27 | 0.95 | | 1.00 | 0.24 | 0.75 | 0.48 | 0.75 | 0.45 | 0.32 | 0.31 | 0.32 | 0.75 | 0.33 | 0.53 | 0.44 | 0.47 |
| E9 | 1.00 | 1.00 | 1.00 | | 1.00 | | 1.00 | 1.00 | 1.00 | 1.00 | 1.00 | 1.00 | 1.00 | 1.00 | 1.00 | 1.00 | 1.00 | 1.00 | 1.00 |
| E11 | 0.96 | 0.84 | 0.02 | 0.98 | 0.24 | 1.00 | | 0.95 | 0.79 | 0.95 | 0.77 | 0.73 | 0.72 | 0.73 | 0.95 | 0.73 | 0.75 | 0.05 | 0.07 |
| E12 | 0.20 | 0.79 | 0.86 | 1.00 | 0.75 | 1.00 | 0.95 | | 0.62 | | 0.00 | 0.50 | 0.64 | 0.50 | 0.00 | 0.51 | 0.93 | 0.96 | 0.99 |
| E13 | 0.69 | 0.04 | 0.79 | 1.00 | 0.48 | 1.00 | 0.79 | 0.62 | | 0.62 | 0.39 | 0.23 | 0.24 | 0.23 | 0.62 | 0.24 | 0.89 | 0.93 | 0.97 |
| E15 | 0.20 | 0.79 | 0.86 | 1.00 | 0.75 | 1.00 | 0.95 | | 0.62 | | 0.71 | 0.50 | 0.64 | 0.50 | 0.00 | 0.51 | 0.93 | 0.96 | 0.99 |
| E17 | 0.77 | 0.54 | 0.79 | 1.00 | 0.45 | 1.00 | 0.77 | 0.71 | 0.39 | 0.71 | | 0.21 | 0.20 | 0.21 | 0.71 | 0.19 | 0.89 | 0.93 | 0.97 |
| E18 | 0.60 | 0.44 | 0.73 | 1.00 | 0.32 | 1.00 | 0.73 | 0.50 | 0.23 | 0.50 | 0.21 | | 0.01 | 0.00 | 0.50 | 0.01 | 0.86 | 0.91 | 0.97 |
| E20 | 0.71 | 0.43 | 0.73 | 1.00 | 0.31 | 1.00 | 0.72 | 0.64 | 0.24 | 0.64 | 0.20 | 0.01 | | 0.01 | 0.64 | 0.03 | 0.86 | 0.91 | 0.97 |
| E22 | 0.60 | 0.44 | 0.73 | 1.00 | 0.32 | 1.00 | 0.73 | 0.50 | 0.23 | 0.50 | 0.21 | 0.00 | 0.01 | | 0.50 | 0.01 | 0.86 | 0.91 | 0.97 |
| E23 | 0.20 | 0.79 | 0.86 | 1.00 | 0.75 | 1.00 | 0.95 | 0.00 | 0.62 | 0.00 | 0.71 | 0.50 | 0.64 | 0.50 | | 0.51 | 0.93 | 0.96 | 0.99 |
| E25 | 0.60 | 0.44 | 0.73 | 1.00 | 0.33 | 1.00 | 0.73 | 0.51 | 0.24 | 0.51 | 0.19 | 0.01 | 0.03 | 0.01 | 0.51 | | 0.86 | 0.91 | 0.97 |
| E27 | 0.94 | 0.92 | 0.83 | 1.00 | 0.53 | 1.00 | 0.75 | 0.93 | 0.89 | 0.93 | 0.89 | 0.86 | 0.86 | 0.86 | 0.93 | 0.86 | | 0.96 | 0.97 |
| E29 | 0.96 | 0.95 | 0.03 | 1.00 | 0.44 | 1.00 | 0.05 | 0.96 | 0.93 | 0.96 | 0.93 | 0.91 | 0.91 | 0.91 | 0.96 | 0.91 | 0.96 | | 0.00 |
| E30 | 0.99 | 0.98 | 0.04 | 1.00 | 0.47 | 1.00 | 0.07 | 0.99 | 0.97 | 0.99 | 0.97 | 0.97 | 0.97 | 0.97 | 0.99 | 0.97 | 0.97 | 0.00 | |
| E32 | 0.99 | 0.98 | 0.04 | 1.00 | 0.47 | 1.00 | 0.07 | 0.98 | 0.97 | 0.98 | 0.97 | 0.96 | 0.96 | 0.96 | 0.98 | 0.96 | 0.97 | 0.00 | 0.00 |

FIG. 9

| SUB-EVENT GROUP | EVENT OCCURRENCE TIME | IN-USE caused by JBossResourceException | caused by ldbc.CommunicationException | caused by: java.io.EOFException | child process still did not die. exit. sending a SIGTERM | com.mysql.jdbc.Communications Exception | Could not create connection | CROND | cups: cupsd shutdown succeeded | cups: cupsd startup succeeded | ERROR [jboss] Query failed | exiting system | INFO [jboss] | INFO [mod-jk] |
|---|---|---|---|---|---|---|---|---|---|---|---|---|---|---|
| E1 | 2009/1/20 7:30 | 0 | 0 | 0 | 0 | 0 | 3 | 0 | 0 | 0 | 0 | 0 | 0 | 0 |
| E3 | 2009/1/20 7:35 | 0 | 0 | 0 | 0 | 0 | 2 | 0 | 0 | 0 | 0 | 3 | 0 | 8 |
| E5 | 2009/1/20 7:40 | 1 | 0 | 0 | 1 | 1 | 3 | 0 | 1 | 1 | 0 | 3 | 21 | 0 |
| E6 | 2009/1/20 7:44 | 1 | 0 | 0 | 0 | 0 | 0 | 0 | 1 | 0 | 0 | 0 | 0 | 0 |
| E8 | 2009/1/20 7:45 | 1 | 0 | 4 | 0 | 0 | 2 | 0 | 0 | 0 | 0 | 3 | 4 | 0 |
| E9 | 2009/1/20 7:49 | 0 | 0 | 0 | 0 | 0 | 0 | 1 | 1 | 1 | 0 | 0 | 0 | 5 |
| E11 | 2009/1/20 7:50 | 0 | 0 | 0 | 0 | 0 | 1 | 0 | 0 | 0 | 0 | 4 | 17 | 0 |
| E12 | 2009/1/20 7:55 | 0 | 0 | 0 | 0 | 0 | 2 | 0 | 0 | 1 | 0 | 0 | 0 | 0 |
| E13 | 2009/1/20 8:00 | 0 | 0 | 0 | 0 | 0 | 3 | 0 | 0 | 0 | 0 | 0 | 0 | 0 |
| E15 | 2009/1/20 8:01 | 0 | 0 | 0 | 0 | 0 | 5 | 0 | 0 | 0 | 0 | 0 | 0 | 0 |
| E17 | 2009/1/20 8:05 | 0 | 0 | 0 | 0 | 0 | 2 | 0 | 0 | 0 | 0 | 0 | 0 | 0 |
| E18 | 2009/1/20 8:10 | 0 | 0 | 0 | 0 | 0 | 3 | 0 | 0 | 0 | 0 | 0 | 0 | 0 |
| E20 | 2009/1/20 8:15 | 0 | 0 | 0 | 0 | 0 | 3 | 0 | 0 | 0 | 0 | 0 | 0 | 0 |
| E22 | 2009/1/20 8:20 | 0 | 0 | 0 | 0 | 0 | 3 | 0 | 0 | 0 | 0 | 0 | 0 | 0 |
| E23 | 2009/1/20 8:25 | 0 | 0 | 0 | 0 | 0 | 2 | 0 | 0 | 0 | 0 | 0 | 0 | 0 |
| E25 | 2009/1/20 8:30 | 0 | 2 | 0 | 0 | 0 | 2 | 0 | 0 | 0 | 0 | 28 | 0 | 0 |
| E27 | 2009/1/20 8:35 | 0 | 0 | 0 | 0 | 0 | 3 | 0 | 0 | 0 | 0 | 2 | 68 | 0 |
| E29 | 2009/1/20 8:40 | 0 | 0 | 0 | 0 | 0 | 2 | 0 | 0 | 0 | 0 | 4 | 168 | 0 |
| E30 | 2009/1/20 8:45 | 0 | 0 | 0 | 0 | 0 | 3 | 0 | 0 | 0 | 0 | 4 | 166 | 0 |
| E32 | 2009/1/20 8:50 | 0 | 0 | 0 | 0 | 0 | 2 | 0 | 0 | 0 | 0 | 0 | 0 | 0 |
| E33 | 2009/1/20 8:55 | 0 | 0 | 0 | 0 | 0 | 3 | 0 | 0 | 0 | 0 | 18 | 0 | 0 |
| E35 | 2009/1/20 9:00 | 0 | 0 | 0 | 0 | 0 | 5 | 0 | 0 | 0 | 0 | 68 | 0 | 0 |
| E37 | 2009/1/20 9:01 | 0 | 0 | 0 | 0 | 2 | 0 | 0 | 0 | 0 | 0 | 7 | 0 | 0 |
| E39 | 2009/1/20 9:02 | 0 | 0 | 0 | 0 | 0 | 2 | 0 | 0 | 0 | 0 | 0 | 0 | 0 |
| E40 | 2009/1/20 9:05 | 0 | 0 | 0 | 0 | 0 | 3 | 0 | 0 | 0 | 0 | 0 | 0 | 0 |
| E41 | 2009/1/20 9:10 | 0 | 0 | 0 | 0 | 0 | 2 | 0 | 0 | 0 | 0 | 0 | 0 | 0 |
| E43 | 2009/1/20 9:15 | 0 | 0 | 0 | 0 | 0 | 3 | 0 | 0 | 0 | 0 | 0 | 0 | 0 |
| E45 | 2009/1/20 9:20 | 0 | 0 | 0 | 0 | 0 | 2 | 0 | 0 | 0 | 0 | 0 | 0 | 8 |
| E47 | 2009/1/20 9:25 | 1 | 0 | 0 | 0 | 0 | 2 | 0 | 0 | 1 | 0 | 3 | 141 | 0 |
| E48 | 2009/1/20 9:30 | 0 | 0 | 0 | 0 | 0 | 3 | 0 | 0 | 1 | 0 | 3 | 42 | 0 |
| E49 | 2009/1/20 9:35 | 0 | 0 | 0 | 0 | 0 | 2 | 0 | 0 | 0 | 0 | 3 | 23 | 5 |
| E50 | 2009/1/20 9:40 | 0 | 0 | 0 | 0 | 0 | 3 | 0 | 0 | 0 | 0 | 0 | 0 | 0 |
| E51 | 2009/1/20 9:45 | 0 | 0 | 0 | 0 | 0 | 2 | 0 | 0 | 0 | 0 | 0 | 0 | 0 |
| C1 | N/A | 0 | 0 | 0 | 0 | 0 | 2 | 1 | 1 | 1 | 0 | 0 | 0 | 0 |

Fig. 10

| CLUSTER NAME | MERGED CLUSTER | MERGED CLUSTER |
|---|---|---|
| C1 | E3 | E6 |
| C2 | E11 | C1 |
| C3 | E15 | C2 |
| C4 | E22 | C3 |
| C5 | E25 | C4 |
| C6 | E30 | C5 |
| C7 | E33 | C6 |
| C8 | E39 | C7 |
| C9 | E41 | C8 |
| C10 | E45 | C9 |
| C11 | E49 | C10 |
| C12 | E52 | C11 |
| C13 | E55 | C12 |
| C14 | E58 | C13 |
| C15 | E64 | C14 |
| C16 | E67 | C15 |
| C17 | E70 | C16 |
| C18 | E83 | C17 |
| C19 | E85 | C18 |
| C20 | E93 | C19 |
| C21 | E96 | C20 |
| C22 | E100 | C21 |
| C23 | E104 | C22 |
| C24 | E111 | C23 |
| C25 | E116 | C24 |
| C26 | E119 | C25 |
| C27 | E121 | C26 |
| C28 | E126 | C27 |
| C29 | E134 | C28 |
| C30 | E139 | C29 |
| C31 | E141 | C30 |
| C32 | E145 | C31 |
| C33 | E150 | C32 |
| C34 | E153 | C33 |
| C35 | E157 | C34 |
| C36 | E162 | C35 |

Fig. 11

| CLUSTER CONFIGURATION | Γ+ | Γ− | Γ |
|---|---|---|---|
| C1 | 10 | 7 | 0.18 |
| C2 | 3 | 10 | −0.54 |
| C3 | 12 | 8 | 0.20 |
| C4 | 4 | 13 | −0.53 |
| C5 | 6 | 10 | −0.25 |
| C6 | 11 | 11 | 0.00 |
| C7 | 5 | 8 | −0.23 |
| C8 | 7 | 9 | −0.13 |
| C9 | 12 | 9 | 0.14 |
| C10 | 8 | 5 | 0.23 |
| C11 | 12 | 10 | 0.09 |
| C12 | 11 | 9 | 0.10 |
| C13 | 8 | 11 | −0.16 |
| C14 | 5 | 10 | −0.33 |
| C15 | 11 | 7 | 0.22 |
| C16 | 3 | 7 | −0.40 |
| C17 | 13 | 11 | 0.08 |
| C18 | 11 | 8 | 0.16 |
| C19 | 6 | 12 | −0.33 |
| C20 | 13 | 7 | 0.30 |
| C21 | 7 | 14 | −0.33 |
| C22 | 13 | 11 | 0.08 |
| C23 | 11 | 14 | −0.12 |
| C24 | 7 | 5 | 0.17 |
| C25 | 8 | 4 | 0.33 |
| C26 | 0 | 0 | 0.00 |
| C27 | 5 | 7 | −0.17 |
| C28 | 7 | 5 | 0.17 |
| C29 | 12 | 9 | 0.14 |
| C30 | 3 | 6 | −0.33 |
| C31 | 8 | 5 | 0.23 |
| C32 | 9 | 9 | 0.00 |
| C33 | 4 | 11 | −0.47 |
| C34 | 3 | 3 | 0.00 |
| C35 | 10 | 5 | 0.33 |
| C36 | 4 | 10 | −0.43 |

Fig. 12

| CLUSTER NAME | SUB-EVENT GROUP |
|---|---|
| C178 | E249, E69, E323 |
| C190 | E200, E101, E98, E300 |
| C193 | E53, E246, E91, E292 |
| C194 | E265, E167, E225, E324 |
| C195 | E105, E158, E258 |
| C198 | E147, E253, E48, E50 |
| C201 | E17, E120, E123, E271, E8, E73, E170 |
| C203 | E274, E221, E328 |
| C204 | E172, E47, E114 |
| C207 | E210, E312, E43, E143, E193 |
| C209 | E57, E207, E309 |
| C210 | E152, E95, E254, E304, E197, E204, E155, E294 |
| E178 | E178 |
| E190 | E190 |
| E193 | E193 |
| E195 | E195 |
| E204 | E204 |
| E207 | E207 |
| ⋮ | ⋮ |

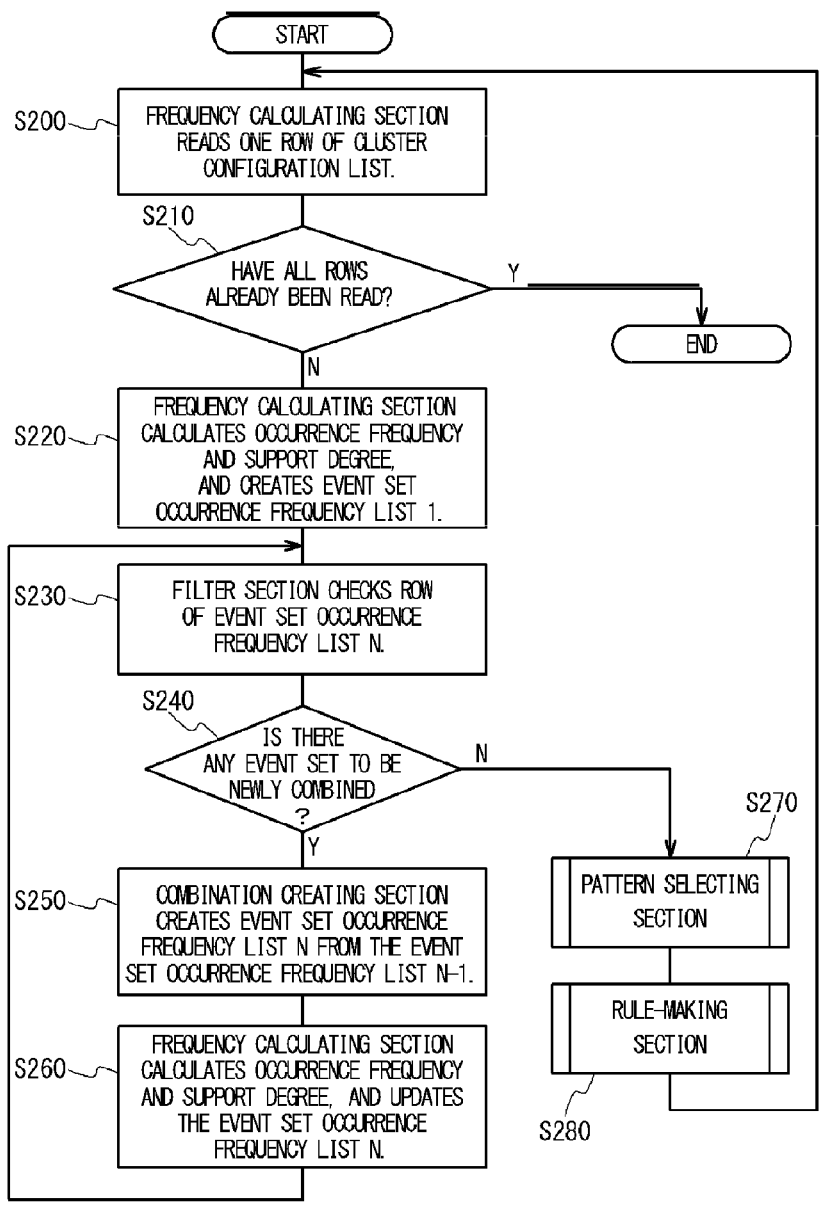

Fig. 14

| EVENT SET | OCCURRENCE FREQUENCY | SUPPORT DEGREE | CHECK |
|---|---|---|---|
| caused by JBossResourceException | 3 | 9% | |
| caused by jdbc.CommunicationException | 4 | 12% | |
| caused by: java.io.EOFException | 1 | 3% | |
| child process still did not exit, sending a SIGTERM | 0 | 0% | |
| com.mysql.jdbc.CommunicationsException | 1 | 3% | |
| Could not create connection | 0 | 0% | |
| CROND | 32 | 97% | ✓ |
| coups: cupsd shutdown succeeded | 0 | 0% | |
| coups: cupsd startup succeeded | 0 | 0% | |
| ERROR [jboss] Query failed | 4 | 12% | |
| exiting system | 1 | 3% | |
| INFO [jboss] | 14 | 42% | |
| INFO [mod-jk] | 12 | 36% | |
| INFO [mysql] | 3 | 9% | |
| INFO httpd | 4 | 12% | |
| INFO sendmail | 0 | 0% | |
| jboss.mq.SpyJMSException:Exiting on IOE | 1 | 3% | |
| JBossResourceException | 0 | 0% | |
| JBossResourceException:Could not create connection | 4 | 12% | |
| Job 'cron.daily' started | 0 | 0% | |
| Job 'cron.daily' terminated | 0 | 0% | |
| Job 'cron.weekly' started | 0 | 0% | |
| Job 'cron.weekly' terminated | 0 | 0% | |
| kernel log | 1 | 3% | |
| modprobe :Can't locate module | 0 | 0% | |
| NestedSQLException | 0 | 0% | |
| Normal exit | 0 | 0% | |
| org.jboss.resource.JBossResourceException | 0 | 0% | |
| org.jboss.util.NestedSQLException | 0 | 0% | |
| org.jboss.util.NestedSQLException: Could not create connection | 4 | 12% | |
| repeated messages | 4 | 12% | |
| sshd: Accepted publickey | 22 | 67% | ✓ |
| sshd: session closed | 22 | 67% | ✓ |
| sshd: session opened | 22 | 67% | ✓ |
| su | 0 | 0% | |

FIG. 15

| EVENT SET | EVENT SET | OCCURRENCE FREQUENCY | SUPPORT DEGREE | CHECK |
|---|---|---|---|---|
| CROND | sshd: Accepted publickey | 22 | 67% | ⌄ |
| CROND | sshd: session closed | 22 | 67% | ⌄ |
| CROND | sshd: session opened | 22 | 67% | ⌄ |
| sshd: Accepted publickey | sshd: session closed | 22 | 67% | ⌄ |
| sshd: Accepted publickey | sshd: session opened | 22 | 67% | ⌄ |
| sshd: session closed | sshd: session opened | 22 | 67% | ⌄ |

FIG. 16

| EVENT SET | EVENT SET | EVENT SET | OCCURRENCE FREQUENCY | SUPPORT DEGREE | CHECK |
|---|---|---|---|---|---|
| CROND | sshd: Accepted publickey | sshd: session closed | 22 | 67% | ✓ |
| CROND | sshd: Accepted publickey | sshd: session opened | 22 | 67% | ✓ |
| CROND | sshd: session closed | sshd: session opened | 22 | 67% | ✓ |
| sshd: Accepted publickey | sshd: session closed | sshd: session opened | 22 | 67% | ✓ |

FIG. 17

| EVENT SET | EVENT SET | EVENT SET | EVENT SET | OCCURRENCE FREQUENCY | SUPPORT DEGREE | CHECK |
|---|---|---|---|---|---|---|
| CROND | sshd: Accepted publickey | sshd: session closed | sshd: session opened | 22 | 67% | ✓ |

Fig. 19A

| No | ASSUMPTION EVENT | | |
|---|---|---|---|
| 1 | CROND | | |
| 2 | CROND | | |
| 3 | CROND | | |
| 4 | sshd: Accepted publickey | | |
| 5 | sshd: Accepted publickey | | |
| 6 | sshd: session closed | | |
| 7 | sshd: Accepted publickey | | |
| 8 | sshd: session closed | | |
| 9 | sshd: session opened | | |
| 10 | sshd: session closed | | |
| 11 | sshd: session opened | | |
| 12 | sshd: session opened | | |
| 13 | CROND | sshd: Accepted publickey | |
| 14 | CROND | sshd: Accepted publickey | |
| 15 | CROND | sshd: session closed | |
| 16 | sshd: Accepted publickey | sshd: session closed | |
| 17 | sshd: session closed | CROND | |
| 18 | sshd: session opened | CROND | |
| 19 | sshd: session opened | CROND | |
| 20 | sshd: session opened | sshd: Accepted publickey | |
| 21 | sshd: Accepted publickey | sshd: session closed | |
| 22 | sshd: Accepted publickey | sshd: session opened | |
| 23 | sshd: session closed | sshd: session opened | |
| 24 | sshd: session closed | sshd: session opened | |
| 25 | sshd: session closed | | |
| 26 | sshd: session opened | | |
| 27 | sshd: session opened | | |
| 28 | sshd: session opened | | |
| 29 | sshd: Accepted publickey | | |
| 30 | sshd: Accepted publickey | | |
| 31 | sshd: session closed | | |
| 32 | sshd: session closed | | |
| 33 | CROND | | |
| 34 | CROND | | |
| 35 | CROND | | |
| 36 | sshd: Accepted publickey | | |
| 37 | CROND | | |
| 38 | sshd: Accepted publickey | | |
| 39 | sshd: session closed | | |
| 40 | sshd: session opened | | |
| 41 | CROND | sshd: Accepted publickey | |
| 42 | CROND | sshd: session closed | |
| 43 | CROND | sshd: session opened | |
| 44 | sshd: Accepted publickey | sshd: session closed | |
| 45 | sshd: Accepted publickey | sshd: session opened | |
| 46 | sshd: session closed | sshd: session opened | |
| 47 | sshd: Accepted publickey | sshd: session closed | sshd: session opened |
| 48 | CROND | sshd: session closed | sshd: session opened |
| 49 | CROND | sshd: Accepted publickey | sshd: session opened |
| 50 | CROND | sshd: Accepted publickey | sshd: session closed |

Fig. 19B

CONFIDENCE DEGREE

| RELATED EVENT | | | | CHECK |
|---|---|---|---|---|
| sshd: Accepted publickey | | | 69% | |
| sshd: session closed | | | 69% | |
| sshd: session opened | | | 69% | |
| sshd: session closed | | | 100% | ✓ |
| sshd: session opened | | | 100% | ✓ |
| sshd: session opened | | | 100% | ✓ |
| CROND | | | 100% | ✓ |
| CROND | | | 100% | ✓ |
| CROND | | | 100% | ✓ |
| sshd: Accepted publickey | | | 100% | ✓ |
| sshd: Accepted publickey | | | 100% | ✓ |
| sshd: session closed | | | 100% | ✓ |
| sshd: session closed | | | 100% | ✓ |
| sshd: session opened | | | 100% | ✓ |
| sshd: session opened | | | 100% | ✓ |
| sshd: session opened | | | 100% | ✓ |
| sshd: Accepted publickey | | | 100% | ✓ |
| sshd: Accepted publickey | | | 100% | ✓ |
| sshd: session closed | | | 100% | ✓ |
| sshd: session closed | | | 100% | ✓ |
| CROND | | | 100% | ✓ |
| CROND | | | 100% | ✓ |
| CROND | | | 100% | ✓ |
| sshd: Accepted publickey | | | 100% | ✓ |
| CROND | sshd: Accepted publickey | | 100% | ✓ |
| CROND | sshd: Accepted publickey | | 100% | ✓ |
| CROND | sshd: session closed | | 100% | ✓ |
| sshd: Accepted publickey | sshd: session closed | | 100% | ✓ |
| sshd: session closed | CROND | | 100% | ✓ |
| sshd: session opened | CROND | | 100% | ✓ |
| sshd: session opened | CROND | | 100% | ✓ |
| sshd: session opened | sshd: Accepted publickey | | 100% | ✓ |
| sshd: Accepted publickey | sshd: session closed | | 69% | |
| sshd: Accepted publickey | sshd: session opened | | 69% | |
| sshd: session closed | sshd: session opened | | 69% | |
| sshd: session closed | sshd: session opened | | 100% | ✓ |
| sshd: Accepted publickey | sshd: session closed | sshd: session opened | 69% | |
| CROND | sshd: session closed | sshd: session opened | 100% | ✓ |
| CROND | sshd: Accepted publickey | sshd: session opened | 100% | ✓ |
| CROND | sshd: Accepted publickey | sshd: session closed | 100% | ✓ |
| sshd: session closed | sshd: session opened | | 100% | ✓ |
| sshd: Accepted publickey | sshd: session opened | | 100% | ✓ |
| sshd: Accepted publickey | sshd: session closed | | 100% | ✓ |
| CROND | sshd: session opened | | 100% | ✓ |
| CROND | sshd: session closed | | 100% | ✓ |
| CROND | sshd: Accepted publickey | | 100% | ✓ |
| CROND | | | 100% | ✓ |
| sshd: Accepted publickey | | | 100% | ✓ |
| sshd: session closed | | | 100% | ✓ |
| sshd: session opened | | | 100% | ✓ |

FAULT ANALYSIS RULE EXTRACTION DEVICE, FAULT ANALYSIS RULE EXTRACTION METHOD AND STORAGE MEDIUM

CROSS REFERENCE TO RELATED APPLICATIONS

This application is a National Stage of International Application No. PCT/JP2011/054896 filed Mar. 3, 2011, claiming priority based on Japanese Patent Application No. 2010-054539 filed Mar. 11, 2010, the contents of all of which are incorporated herein by reference in their entirety.

TECHNICAL FIELD

The present invention relates to a technique which automatically relates event logs, which are outputted by a system and have relationships with each other, and analyzes a fault.

BACKGROUND ART

A system manager refers to event logs of a system for analyzing a fault of the system. If a great number of event logs occur from a single fault cause in a chain reaction manner or if a plurality of faults occurs simultaneously, a great number of event logs are outputted. In this case, it is difficult that the system manager analyzes each event log individually to identify the fault, and therefore the identification of the fault depends on a skill of the system manager. Consequently, a technique is known which makes a system manager easily identify a fault by relating a plurality of event logs with each other to clarify a relationship among event logs.

Japanese patent application JP 2005-216148 A (Patent literature 1) discloses an invention regarding an event analysis device, an event analysis method and an event analysis program which perform an analysis of an event occurring in a control system using a computer of a chemical plant and the like. An alarm described in JP 2005-216148 A (Patent literature 1) can be treated as the same meanings as an event or an event log in the description of the present invention. Thus, hereinafter, the alarm is called the event. An embodiment of this invention is described, for example, as follows. 24 hours is divided every minute into 1440 division, and then, with respect to data of which the number of samples is 1440, a relationship between an event 1 and an event 2 is searched. First, as for the event 1, each division is made to correspond to "1" if the event 1 occurs in the division, and is made to correspond to "0" if the event 1 does not occur in the division, thereby a bit sequence with 1440 bits is created. Similarly, as for the event 2, a bit sequence with 1440 bits is created. Next, the event 1 is used as a reference and Δt is assumed to be a difference between occurrence times of the events 1 and 2. Then, for example, in a time band −100≤Δt≤+100, a logical AND is executed between the bit sequence of the event 1 and the bit sequence of the event 2 having the time difference Δt with respect to the bit sequence of the event 1. Then, the number of the bits, which has "1" as the result of the logical AND, is defined as the relationship value. In this range of the Δt, 201 relationship values are calculated. Next, the maximum value in the 201 relationship values is defined as the maximum relationship value. Then, the event 1 and the event 2 are related with each other in the occurrence time difference where the maximum relationship value occurs. Since a probability of the maximum relationship value is varied depending on the number of occurrences of the event 1 and the event 2, this probability is defined as an independent probability. The lower the independent probability is, the higher two events are judged to have a relationship. When the cluster analysis is performed on the events, the independent probabilities are calculated for all combinations between the events and the independent probability is defined as dissimilarity. Then, a similarity is obtained as a difference between "1" and the dissimilarity. After that, the cluster analysis is performed based on the similarity, and the events having the relationship are classified.

According to the method of the invention in JP 2005-216148 A (Patent literature 1), the similarity is defined based on the independent probability and then the cluster analysis is performed. However, since the independent probability depends on the number of occurrences of the events, the relationship of the events in which the fault whose occurrence frequency is low is overlooked by the fault whose occurrence frequency is high. This is one of the problems. For example, it is assumed that the event 1 and the event 2 as the chained events occur 10 times from the fault A at the same time division, and the event 1 and the event 3 as the chained events occurs 100 times from the fault B at the same time division. In this case, the fault B occurs a lot of times, and the fault A is low in the occurrence frequency as compared with the fault B. In the invention in JP 2005-216148 A (Patent literature 1), when the independent probability of the event 1 and the event 2 of the fault A is considered, if the event 1 occurs 110 times, the event 1 and the event 2 occur simultaneously 10 times. Therefore, the independent probability of the event 1 and the event 2 of the fault A is high. When the occurrence frequency of the event 1 is calculated summing up for all time divisions, the independent probability of the event 1 and the event 2 is further high. Thus, there is a high probability that the event 1 and the event 2 are deemed not to have the relationship with each other.

In addition, generally, when a fault analysis rule, which relates event logs each of which is supposed to occurs from the same fault, is extracted from an event log file, there is a following problem. Even though an event occurrence pattern of a fault is high in an occurrence frequency, if an event occurrence pattern of another fault is mixed, the property of the event occurrence pattern is averaged, therefore, a fault analysis rule of a fault whose occurrence frequency is high cannot be extracted.

To solve these problems, it is required that a system manager inputs a relationship between a fault and an event, divides events in respective faults and relates event logs. Since this dividing is performed by hand, it takes a lot of man-hours. In addition, there is another problem that the dividing by hand cannot be performed if the know-how regarding the fault is not accumulated.

CITATION LIST

Patent Literature

[PTL 1] JP 2005-216148 A

SUMMARY OF INVENTION

A first object of the present invention is to automatically extract a high high-accuracy fault analysis rule by only inputting event logs of a system without a system manager inputting a relationship between a fault and an event log to accumulate a fault analysis rule based on his/her experience.

A second object of the present invention is to extract a high high-accuracy fault analysis rule in which there is less omission of extraction of a fault analysis rule even if a variety of faults occurs or even if a fault occurs in a low occurrence frequency.

A fault analysis rule extraction device of the present invention includes: an event preprocessing section and a fault analysis rule extraction section. The event preprocessing section performs a cluster analysis on event logs grouped every certain time period to classify the event logs into clusters, wherein the event logs in each of the clusters have the same event occurrence pattern. The fault analysis rule extraction section extracts a fault analysis rule which relates the event logs that can be presumed to occur from the same fault every cluster of the classified clusters.

A fault analysis rule extraction method of the present invention is executed by a fault analysis rule extraction device. The fault analysis rule extraction method includes: an event set creating step which creates, with reference to event occurrence time in event logs, with respect to an inputted event log file, a set of event logs every certain time period; a cluster classifying step which performs a cluster analysis on the set of the event logs to classify the event logs into clusters; and a fault analysis rule extraction step which outputs a fault analysis rule file indicating a fault analysis rule that relates the event logs that can be presumed to occur from the same fault by associating the event logs with each other every cluster of the classified clusters in the cluster analysis.

In a storage medium of the preset invention, a fault analysis rule extraction program is stored. The fault analysis rule extraction program is a computer program for realizing the above-described fault analysis rule extraction method by a computer.

A first effect is that a high high-accuracy fault analysis rule can be automatically extracted by only inputting an event log of a system without a system manager inputting a relationship between a fault and an event log to accumulate a fault analysis rule based on his/her experience.

A second effect is that a high high-accuracy fault analysis rule can be extracted in which there is less omission of extraction of a fault analysis rule even if a variety of faults occurs or even if a fault occurs in a low occurrence frequency.

BRIEF DESCRIPTION OF DRAWINGS

The above and other objects, advantages and features of the present invention will be more apparent from the following description of certain preferred exemplary embodiments taken in conjunction with the accompanying drawings, in which:

FIG. 5 is an example of an event log file outputted by a system;

FIG. 6 is an example of a cluster list file according to the exemplary embodiment of the present invention;

FIG. 8 is an example of an inter-cluster dissimilarity list file according to the exemplary embodiment of the present invention;

FIG. 9 is an example of a cluster list file which is updated by a cluster analysis section according to the exemplary embodiment of the present invention;

FIG. 10 is an example of a tree diagram file which is created by the cluster analysis section according to the exemplary embodiment of the present invention;

FIG. 11 is a calculation example calculated by a Γ-index method of an optimal cluster configuration selecting section according to the exemplary embodiment of the present invention;

FIG. 12 is an example of a cluster configuration list file according to the exemplary embodiment of the present invention;

FIG. 13 is a flowchart of the pattern detecting section according to the exemplary embodiment of the present invention;

FIG. 14 is an example of an event set occurrence frequency list 1 file according to the exemplary embodiment of the present invention;

FIG. 15 is an example of an event set occurrence frequency list 2 file according to the exemplary embodiment of the present invention;

FIG. 16 is an example of an event set occurrence frequency list 3 file according to the exemplary embodiment of the present invention;

FIG. 17 is an example of an event set occurrence frequency list 4 file according to the exemplary embodiment of the present invention;

FIG. 19A is an event combination list file according to the exemplary embodiment of the present invention;

FIG. 19B is an event combination list file according to the exemplary embodiment of the present invention.

DESCRIPTION OF EXEMPLARY EMBODIMENTS

[Description of Configuration]

Figure 1:
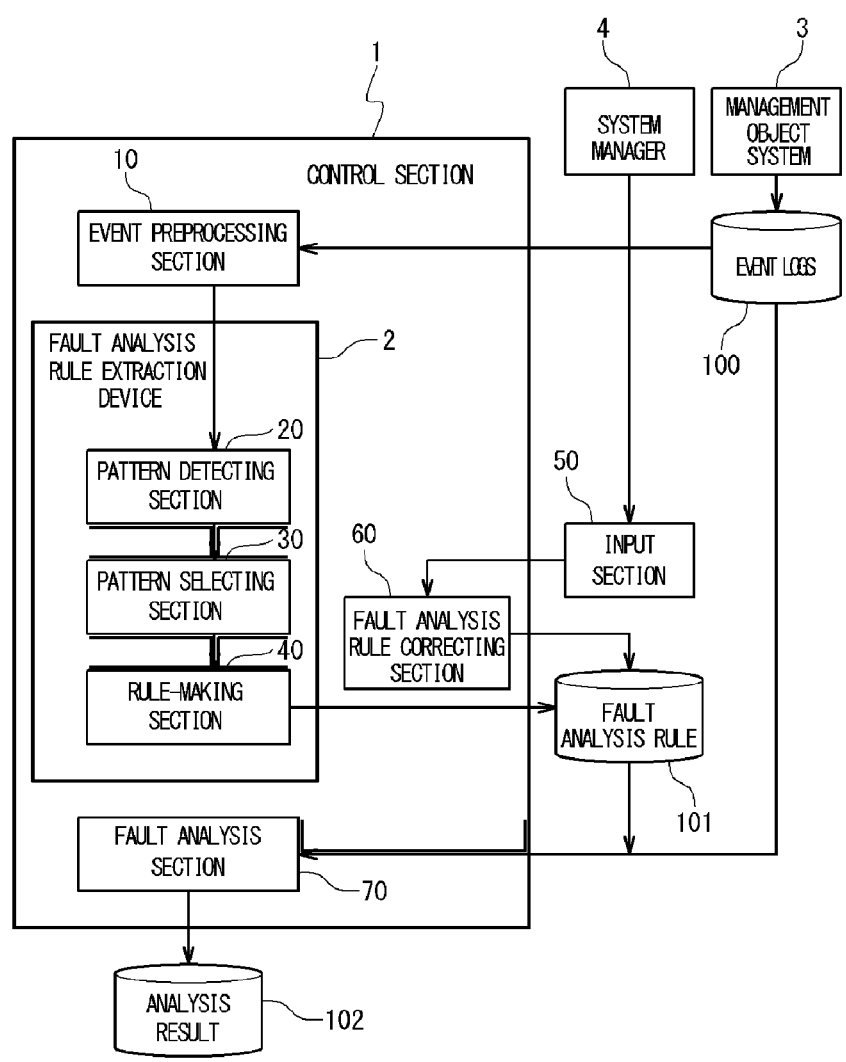
FIG. 1 is a block diagram of a fault analysis rule extraction device according to an exemplary embodiment of the present invention.

A fault analysis rule extraction device according to the exemplary embodiment of the present invention will be described below referring to the accompanying drawings. FIG. 1 is a block diagram of the fault analysis rule extraction device according to the present exemplary embodiment.

A control section 1 of the fault analysis rule extraction device includes: an event preprocessing section 10, a fault analysis rule extraction device 2, a fault analysis rule correcting section 60 and a fault analysis section 70.

The fault analysis rule extraction device 2 includes a pattern detecting section 20, a pattern selecting section 30, and a rule-making section 40.

A management object system 3 outputs event logs 100 which are stored as an event log file. When the event log file is inputted to the event preprocessing section 10, the event preprocessing section 10 performs a cluster analysis of the event logs and evaluation of the classified clusters, and outputs configuration data of the clusters to the fault analysis rule extraction section 2. The fault analysis rule extraction section 2 makes the pattern detecting section 20, the pattern selecting section 30 and the rule-making section 40 execute processing in this order using a priori method (Agrawal R, Srikant R, "Fast algorithm for mining association rules", IBM. Research Report, 1994) etc. to output a fault analysis rule 101 which relates event logs that can be presumed to occur from the same fault. The system manager 4 can correct the fault analysis rule 101 outputted by the fault analysis rule extraction device. When the system manger 4 operates the fault analysis rule extraction device from an input section 50, the fault analysis rule 101 is corrected by the fault analysis rule correcting section 60. The fault analysis section 70 executes a fault analysis using the event log file stored by the management object system 3 and the fault analysis rule 101 as the input, and outputs an analysis result 102 of the event logs.

Figure 2:
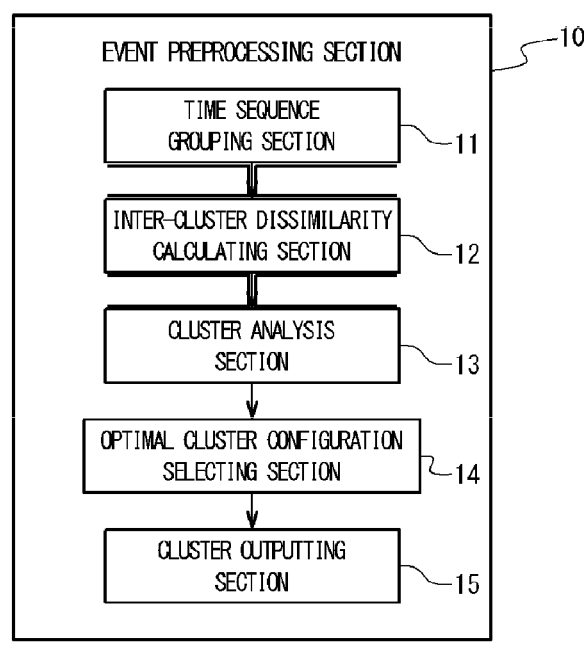
FIG. 2 is a block diagram of an event preprocessing section according to the exemplary embodiment of the present invention.

Next, with reference to the accompanying drawings, a configuration of the event preprocessing section 10 according to the exemplary embodiment of the present invention will be described be low. FIG. 2 is a block diagram of the event preprocessing section 10 according to the exemplary embodiment of the present invention. The event preprocessing section 10 includes a time sequence grouping section 11, an inter-cluster dissimilarity calculating section 12, a cluster analysis section 13, an optimal cluster configuration selecting section 14 and a cluster outputting section 15.

Figure 3:
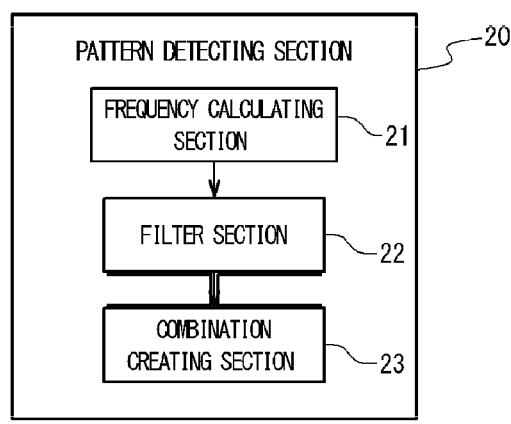
FIG. 3 is a block diagram of a pattern detecting section according to the exemplary embodiment of the present invention.

Next, with reference to the accompanying drawings, a configuration of the pattern detecting section 20 according to the exemplary embodiment of the present invention will be described below. FIG. 3 is a block diagram of the pattern detecting section 20 according to the exemplary embodiment of the present invention. The pattern detecting section 20 includes a frequency calculating section 21, a filter section 22 and a combination creating section 23.

Figure 4:
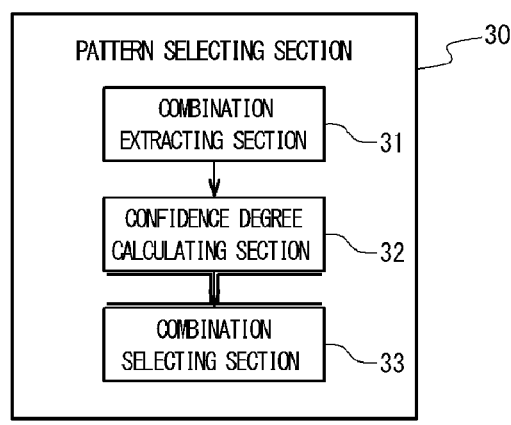
FIG. 4 is a block diagram of a pattern selecting section according to the exemplary embodiment of the present invention.

Next, with reference to the accompanying drawings, a configuration of the pattern selecting section 30 according to the exemplary embodiment of the present invention will be described below. FIG. 4 is a block diagram of the pattern selecting section 30 according to the exemplary embodiment of the present invention. The pattern selecting section 30 includes a combination extracting section 31, a confidence degree calculating section 32 and a combination selecting section 33.

These are the description of the configuration of the fault analysis rule extraction device according to the exemplary embodiment of the present invention.

Next, an operation of the fault analysis rule extraction device according to the exemplary embodiment of the present invention will be described in detail.

First, the event preprocessing section 10 will be described. The event preprocessing section 10 uses the cluster analysis which is one of the data analysis methods for classifying a plurality of event logs.

First, the event logs which are objects for the cluster analysis will be described. When a state variation of the system occurs, the management object system 3 additionally writes this state variation as an event to the event log file. FIG. 5 is an example of the event log file outputted by the system. The event log includes event occurrence time, an event occurrence place, an event class, an event message, another attribution and so on.

Figure 7:
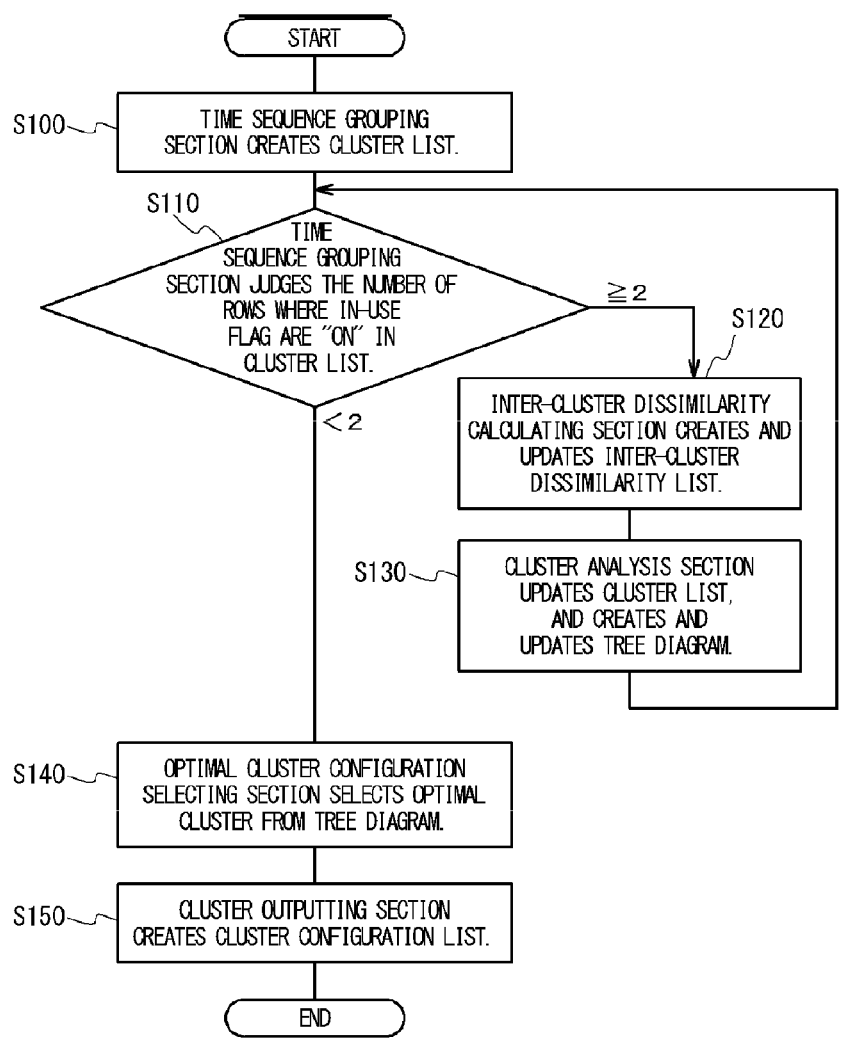
FIG. 7 is a flowchart of the event preprocessing section according to the exemplary embodiment of the pre sent invention.

With reference to accompanying drawings, the event preprocessing section 10 according to the exemplary embodiment of the present invention will be described below. FIG. 7 is a flowchart of the event preprocessing section 10 according to the exemplary embodiment of the present invention.
(Step S100)
The time sequence grouping section 11 receives the event log file as an input and transmits the cluster list file as an output. With reference to the event occurrence time, the time sequence grouping section 11 groups event logs every certain time period to create sets of event logs. Here, a set of event logs is referred to as a sub-event group. The time sequence grouping section 11 counts the number of events every event class in units of the sub-event group and writes it to the cluster list file. FIG. 6 is an example of the cluster list file according to the exemplary embodiment of the present invention. Because of space limitations, all of event classes are not shown in this figure. The cluster list has the event occurrence time, an in-use flag and event items for each event class while using the sub-event group as a key. In the example of the cluster list of FIG. 6, the sub-event group is created every one minute. For example, the sub-event group E1 is a group that groups events occurring for one minute at 2009/1/20 17:30:00 and indicates occurrence of three events of "Could no create connection". In the cluster list, a row is created only for a time period when an event occurs. In the example of the cluster list of FIG. 6, for example, it is found that no event occurs in the time period of 2009/1/20 17:31:00 to 2009/1/20 17:34:59.

An initial value of the in-use flag which is used for a processing described later is set to be "ON" when the cluster list is created by the time sequence grouping section 11.
(Step S110)
The time sequence grouping section 11 judges the number of rows in the cluster list, where the in-use flags are "ON". If the number of rows where the in-use flags are "ON" is equal to or more than two, the process goes to Step S120. If the number of rows where the in-use flags are "ON" is less than two, the process goes to Step S140.
(Step S120)
First, a treatment of the sub-event group En will be described.

The sub-event group En can be assumed to be a vector if an event class is made to correspond to a dimension of the vector space. For example, if the number of kinds of the event class is 44, the sub-event group En can be assumed to be the vector with 44 dimensions.

The dissimilarity d (E1, E2) between the sub-event groups E1 and E2 is defined as follows.

$$d(E_1, E_2) = 1 - \frac{E_1 \cdot E_2}{|E_1||E_2|} \qquad \text{[Equation 1]}$$

Here, E1·E2 indicates an inner product of the vectors, and |E1| indicates a length of the vector.

The d is used for a distance function for performing the cluster analysis of the sub-event group En.

For example, the example of the cluster list file of FIG. 6 indicates E1=(0, 0, 0, 0, 0, 3, 0, 0, 0, 0, 0, 0, 0, 0, 0, 0, 0, 0, 0, 0, 0, 1, 0, 0, 0, 0, 0, 0, 0, 0, 0, 0, 0, 0, 1, 0, 1, 1, 1, 0, 0, 0, 0, 0), and E3=(0, 0, 0, 0, 0, 2, 0, 0, 0, 0, 0, 0, 8, 0, 0, 0, 0, 0, 0, 0, 0, 0, 0, 0, 0, 0, 0, 0, 3, 3, 3, 0, 0, 0, 0, 0, 0, 0, 0, 0, 0, 0, 0, 0). Here, in the cluster list file of FIG. 6, all of the event classes are not described because of space limitations. Based on |E1|≈3.7, |E3|≈9.7, E1·E3=6, the result is as follows.

$$d(E_1, E_3) = 1 - \frac{E_1 \cdot E_3}{|E_1||E_3|} = 1 - \frac{6}{3.7 \times 9.7} \approx 0.84 \qquad \text{[Equation 2]}$$

The inter-cluster dissimilarity calculating section 12 calculates dissimilarities with respect to all of the combinations of the sub-event groups whose in-use flags are "ON" to create the inter-cluster dissimilarity list file. FIG. 8 is an example of the inter-cluster dissimilarity list file according to the exemplary embodiment of the present invention. The inter-cluster dissimilarity list file is a matrix that the sub-event groups En whose in-use flags are "ON" are assigned to the rows and the columns, and that the dissimilarities corresponding to the rows and the columns are set as the elements of the matrix. In FIG. 8, the dissimilarity is calculated to two places of decimals. Here, the diagonal element does not have a value, because the diagonal element corresponds to the dissimilarity of the identical sub-event groups En. However, the diagonal element may be "1" which is the maximum value of the dissimilarity. In addition, for example, the element of the E1 row and the E3 column and the element of the E3 row and the E1 column have the same dissimilarity. Therefore, the inter-cluster dissimilarity list is a symmetric matrix.

(Step S130)

The cluster analysis section 13 retrieves the minimum value of the dissimilarity from the inter-cluster dissimilarity list file, and merges the sub-event groups En whose dissimilarity is the minimum value with each other to create the cluster C1. The cluster analysis section 13 additionally writes the cluster C1 into the cluster list file. At that time, the number of the event occurrences of each event class is the sum of the numbers of the event occurrences of the respective sub-event groups. For example, it is assumed to be the average of the vector sum: C1=(E1+E2)/2. When additionally writing the cluster C1 into the cluster list file, the cluster analysis section 13 does not set a value for the event occurrence time. Further, when additionally writing the cluster C1 into the cluster list file, the cluster analysis section 13 sets the in-use flag to be "ON" for the cluster C1 and sets the in-use flag to be "OFF" for the respective sub-event groups which come to be included in the cluster C1.

In the example of the inter-cluster dissimilarity list file of FIG. 8, for example, the dissimilarity between the sub-event group E3 and the sub-event group E6 of 0.00 is retrieved as the minimum value of the dissimilarity. The cluster analysis section 13 merges the sub-event group E3 and the sub-event group E6 to create the cluster C1=(E3+E6)/2. When additionally writing the cluster C1 into the cluster list file, the cluster analysis section 13 does not set the event occurrence time. Further, when additionally writing the cluster C1 into the cluster list file, the cluster analysis section 13 sets the in-use flag to be "ON" for the cluster C1 and sets the in-use flag to be "OFF" for the sub-event group E3 and the sub-event group E6 which come to be included in the cluster C1. FIG. 9 is an example of the cluster list file which is updated by the cluster analysis section according to the exemplary embodiment of the present invention.

In addition, as for the sub-event groups Ei whose dissimilarity is equal to or more than a certain value in the other sub-event groups En, the cluster analysis section 13 does not require to merge them together. Therefore, the cluster analysis section 13 sets the in-use flag to be "OFF" for the sub-event groups Ei in the cluster list file. Each of the sub-event groups Ei unnecessary to be merged together is treated as a single cluster in itself. For example, in the example of the inter-cluster dissimilarity list file of FIG. 8, the sub-event group E9 takes a value of "1", which is the maximum value of the dissimilarity with respect to any other sub-event groups En. Thus, the sub-event group E9 is treated as a single cluster without being merged with other clusters.

The cluster analysis section 13 also creates a tree diagram file at the same time. In the tree diagram file, the cluster analysis section 13 additionally writes the cluster merged by the cluster analysis section 13 and the respective sub-event groups including in the merged cluster. FIG. 10 is an example of the tree diagram file which is created by the cluster analysis section according to the exemplary embodiment of the present invention. The tree diagram file of FIG. 10 has a cluster name and items of a merged cluster. The cluster name is a name of the merging cluster created by the cluster analysis section 13. The merged cluster is a cluster included in the merging cluster created by the cluster analysis section 13. With reference to the tree diagram file, the relationship between the clusters can be visually expressed as a tree diagram.

After the cluster analysis section 13 additionally writes the merging cluster into the cluster list file and the tree diagram file, the process goes bake to the step S110 to perform processing of the inter-cluster dissimilarity calculating section 12 and the cluster analysis section 13 based on the updated cluster list file.

Incidentally, the centroid method is applied as the cluster analysis method in the calculation of the dissimilarity of the present invention, because the average of the vector sum is used for merging the clusters. However, another cluster analysis method such as the nearest neighbor method, the furthest neighbor method, the group average method, the median method, the ward method and so on can be applied.

(Step S140)

The optimal cluster configuration selecting section 14 selects an optimal cluster from the tree diagram file by using the cluster evaluation method. As for the cluster evaluation method, the σ-index method (F B Baker, L J Hubert, Measuring the power of hierarchical cluster analysis, Journal of the American Statistical Association, 1975) and the Beale test (Beale, E. M. L. (1969), Cluster analysis. London: Scientific Control Systems.) are applied Here, the Γ-index method will be described.

For each cluster C, a set of dissimilarities in the cluster is defined as follows.

$$D_I(C)=\{d(c_m,c_n)|c_m,c_n \in C\} \qquad \text{[Equation 3]}$$

The union $D_I$ of $D_I(C)$ is defined as follows.

$$D_I = \cup_C D_I(C) \qquad \text{[Equation 4]}$$

The set of the dissimilarities between clusters is defined as follows.

$$D_E=\{d(c_m,c_n)|c_m \in C_1, c_n \in C_2, C_1 \neq C_2\} \qquad \text{[Equation 5]}$$

In this case, Γ+, Γ− and Γ are defined as follows.

$$\Gamma_+ = |\{(d_I, d_E) \mid d_I \in D_I, d_E \in D_E, d_I \geq d_E\}| \qquad \text{[Equation 6]}$$

$$\Gamma_- = |\{(d_I, d_E) \mid d_I \in D_I, d_E \in D_E, d_I < d_E\}| \qquad \text{[Equation 7]}$$

$$\Gamma = \frac{\Gamma_+ - \Gamma_-}{\Gamma_+ + \Gamma_-} \qquad \text{[Equation 8]}$$

The optimal cluster configuration selecting section 14 calculates P for each cluster and selects the cluster having the maximum value of P as the optimal cluster. FIG. 11 is a calculation example calculated by the Γ-index method of the optimal cluster configuration selecting section according to the exemplary embodiment of the present invention. In this example, since Γ of C25 is the maximum value of 0.33, the optimal cluster configuration selecting section 14 selects the C25 as the optimal cluster and selects the row of the C25 from the tree diagram file. Here, Γ of C35 is also 0.33. However, in this example, by employing the cluster whose number is smaller, the classification result in which the number of the clusters is larger is prioritized. A method of selecting a cluster in the case that there are multiple clusters which have the maximum values of Γ can be arbitrarily determined based on a guideline.

(Step S150)

The cluster outputting section 15 creates a cluster configuration list file with reference to the cluster list file based on the row of the tree diagram file of the cluster selected by the optimal cluster configuration selecting section 14. FIG. 12 is an example of the cluster configuration list file according to the exemplary embodiment of the present invention. The cluster configuration list file contains a cluster name as a key and has items of sub-event groups included in the cluster which is the key.

The cluster outputting section 15 selects the cluster names, which appear as far as the row of the tree diagram file of the cluster selected by the optimal cluster configuration selecting section 14, as candidates of the cluster names of the cluster configuration list file. Next, excluding the cluster names, as far as the selected row, appearing in the column of the merging cluster, the cluster outputting section 15 writes the remaining cluster names of the tree diagram file into the cluster names of the cluster configuration list file. Then, the cluster outputting section 15 acquires all of the sub-event groups included in the cluster and writes them into the item of the sub-event group of the cluster configuration list file by tracing the tree diagram file with respect to the cluster name selected from the tree diagram.

Next, the pattern detecting section 20 of the fault analysis rule extraction section 2 will be described. FIG. 13 is a flowchart of the pattern detecting section 20 according to the exemplary embodiment of the present invention.

(Step S200)

The frequency calculating section 21 reads one row of the cluster configuration list file for performing processing on each cluster.

(Step S220)

With respect to the sub-event groups included in the row of the cluster which is read at Step S200, in each event class, the frequency calculating section 21 counts the number of the sub-event groups in which the event occurs with reference to the cluster list file. In addition, the frequency calculating section 21 calculates a ratio of the counted number of the sub-event groups to all of the sub-event groups as a support degree of the event.

That is, it is assumed that a support degree of an event e is sup (e), a sub-event group is En and a set of the entire sub-event groups is U, the support degree is as follows.

$$sup(e) = \frac{|\{E_n \in U \mid e \subset E_n\}|}{|U|} \quad \text{[Equation 9]}$$

For example, it is assumed that the cluster C202 includes the sub-event groups {E27, E345, E287, E282, E238, E234, E187, E183, E136, E132, E84, E80, E29, E35, E347, E285, E236, E184, E135, E32, E81, E130, E289, E243, E190, E140, E40, E89, E342, E78, E230, E181, E280}. At this time, in the case that the "INFO [jboss]" event occurs in 14 sub-event groups with reference to the cluster list file, since there are 33 sub-event groups in the cluster C202, the support degree of the "INFO [jboss]" event is 14/33=0.42, that is, the support degree is 42%.

The frequency calculating section 21 calculates the foregoing counted number of the sub-event groups and the support degree of the event for all of the event classes, and creates an event set occurrence frequency list 1 file. Here, the number "N" of the event set occurrence frequency list N indicates that, when N is equal to or more than 2, the frequency calculating section 21 calculates the counted number of the sub-event groups and the support degree of the event for combinations of the events in which the number of the combinations is N. The case that N is equal to or more than 2 will be described later. FIG. 14 is an example of the event set occurrence frequency list 1 file according to the exemplary embodiment of the present invention. The event set occurrence frequency list 1 file has an event set, an occurrence frequency, a support degree and a check item. To the event set of the event set occurrence frequency list 1 file, the event class of the event logs is set. To the occurrence frequency, the number of the sub-event groups whose events occur in the target cluster is set. To the support degree, the support degree of the event in the target cluster is set. The check item is set by the filter section 22 at Step S230.

(Step S230)

The filter section 22 checks the row of the event set occurrence frequency list N which has the value equal to or more than the minimum support degree with reference to the support degree of the event set occurrence frequency list N. The minimum support degree is, for example, the value of 0.5 and the like.

(Step S240)

The combination creating section 23 creates an event set occurrence frequency list N+1 based on the event set occurrence frequency list N file. When considering the combinations of $_NC_n$ (n=1, 2, . . . ), if n=N is achieved, the combination creating section 23 determines that all of the combinations are created, and the process goes to Step S270. If n=N is not achieved, the process goes to Step S250.

(Step S250)

The combination creating section 23 creates the event set occurrence frequency list N+1 by combining the events checked in the event set occurrence frequency list N based on the event set occurrence frequency list N. The items included in the event set occurrence frequency list N file (N≥2) are the same as those of the event set occurrence frequency list 1 file except that the event set is the combination of N events.

First, a method of creating the event set occurrence frequency list 2 file from the event set occurrence frequency list 1 file will be described. FIG. 15 is an example of the event set occurrence frequency list 2 file according to the exemplary embodiment of the present invention. In this example, the event set occurrence frequency list 2 file is created based on the example of the event set occurrence frequency list 1 file shown in FIG. 14. That is, the events checked in FIG. 14 are "CROND", "sshd: Accepted publickey", "sshd: session closed", "sshd: session opened". Therefore, in the event set occurrence frequency list 2 file of FIG. 15, $_4C_2$=6 rows which corresponds to the combinations of these events are created. The occurrence frequency and the support degree of the event set occurrence frequency list 2 file of FIG. 15 will be set by the frequency calculating section 21 at Step S260. The check column will be set by the filter section 22 as Step S230.

Next, a method of creating the event set occurrence frequency list N+1 file based on the event set occurrence frequency list N file (N≥2) will be described. The event set occurrence frequency list N+1 is created by combining elements of the event set occurrence frequency list N. In this case, the combinations of the events, in which any one of the events is excluded from the combined event sets, must correspond to the elements checked in the event set occurrence frequency list N. For example, with respect to an event a, an event b and an event c, when a combined event set (a, b, c) of the event set occurrence frequency list 3 file is created from elements (a, b) and (b, c) of the event sets checked in the event set occurrence frequency list 2 file, all of (a, b), (a, c) and (b, c) must be checked in the event set occurrence frequency list 2 file. If all of (a, b), (a, c) and (b, c) is not checked in the event set occurrence frequency list 2 file, the event set (a, b, c) is not included in the event set occurrence frequency list 3 file. This condition does not cause a problem when the event set occurrence frequency list 2 file is created base on the event set occurrence frequency list 1 file because it is surely satisfied.
(Step S260)

Similarly to the case that the event set occurrence frequency list 1 file is created, the frequency calculating section 21 calculates the number of the sub-event groups and the support degree of the event and updates the event set occurrence frequency list N file. For example, in the example of the event set occurrence frequency list 2 file of FIG. 15, in the row of "CROND" and "sshd: Accepted publickey", the occurrence frequency is 22 and the support degree is 67%. These mean that the number of the sub-event groups including both of "CROND" and "sshd: Accepted publickey" is 22, the number of all sub-event groups in the target cluster is 33, and therefore 22/33≈0.67. The check column of the event set occurrence frequency list 2 file of FIG. 15 will be set by the filter section 22 when the process goes back to Step S230.

As described above, by repeating Step S230, Step S240, Step S250 and Step S260, the event set occurrence frequency list N file (N≥2) is created. As examples that N is equal to or more than 3, FIG. 16 is an example of an event set occurrence frequency list 3 file according to the exemplary embodiment of the present invention. FIG. 17 is an example of an event set occurrence frequency list 4 file according to the exemplary embodiment of the present invention.
(Step S270)

Figure 18:
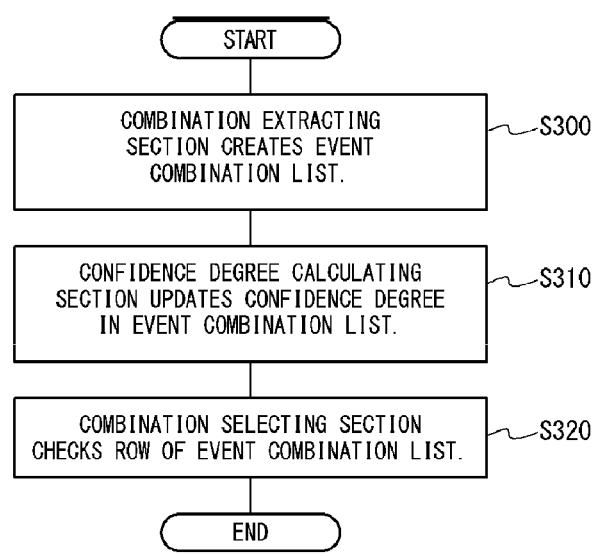
FIG. 18 is a flowchart of the pattern selecting section according to the exemplary embodiment of the present invention.

Since the pattern selecting section 30 is the processing block next to the pattern detecting section 20, it will be described later with reference to the FIG. 18 of a flowchart of the pattern selecting section according to the exemplary embodiment of the present invention.
(Step S280)

Figure 20:
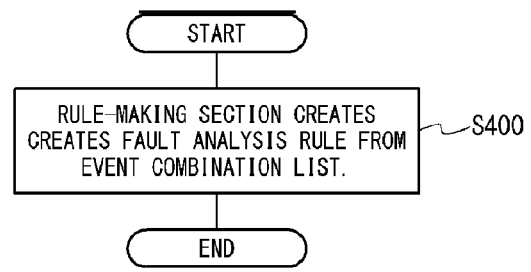
FIG. 20 is a flowchart of a rule-making section according to the exemplary embodiment of the present invention.

Since the rule-making section 40 is the processing block next to the pattern selecting section 30, it will be described later with reference to the FIG. 20 of a flowchart of the rule-making section according to the exemplary embodiment of the present invention.

When finishing Step S280, the process for one row of the cluster configuration list file is ended.

The pattern detecting section 20 performs the similar process on the cluster described in the next row of the cluster configuration list by going back to Step S200.

The above is the description of the pattern detecting section 20 according to the exemplary embodiment of the present invention.

Next, the pattern selecting section 30 of the fault analysis rule extraction section 2 will be described. FIG. 18 is a flowchart of the pattern selecting section according to the exemplary embodiment of the present invention.
(Step S300)

With reference to the event set occurrence frequency list N file (N=1, 2, . . . ) created by the pattern detecting section 20, the combination extracting section 31 constructs a combination of assumption event(s) and its related event(s) set to create an event combination list file. FIGS. 19A and 19B are the event combination list files according to the exemplary embodiment of the present invention. The event combination list file has an assumption event, a related event, confidence degree and a check item. Each row of the event combination list in this example corresponds to the event set occurrence frequency list 2 file of FIG. 15, the event set occurrence frequency list 3 file of FIG. 16 and the event set occurrence frequency list 4 file of FIG. 17. The first to twelfth rows of the event combination list of FIGS. 19A and 19B correspond to the elements created based on the event set occurrence frequency list 2 file of FIG. 15. The thirteenth to thirty-sixth rows of the event combination list of FIGS. 19A and 19B correspond to the elements created based on the event set occurrence frequency list 3 file of FIG. 16. When the combination extracting section 31 constructs the combination of the assumption event (s) and its related event set based on the event set occurrence frequency list 3 file, the combinations of the case of two assumption events and one related event and the case of one assumption event and two related events are considered. The thirty-seventh to fiftieth rows of the event combination list of FIGS. 19A and 19B correspond to the elements created based on the event set occurrence frequency list 4 file of FIG. 17. When the combination extracting section 31 constructs the combination of the assumption event (s) and its related event set based on the event set occurrence frequency list 4 file, the combinations of the case of one assumption event and three related event, the case of two assumption events and two related events and the case of three assumption event and one related events are considered.

The confidence degree of the event combination list file of FIGS. 19A and 19B is set by the confidence degree calculating section 32 at Step S310. The check column of the event combination list file of FIGS. 19A and 19B is set by the combination selecting section 33 at Step S320.
(Step S310)

The confidence degree calculating section 32 calculates confidence degree of each row of the event combination list file with reference to the event set occurrence frequency list file. The confidence degree is a probability that the assumption event and the related event occur when the assumption event occurs.

For example, with respect to an event a, an event b and an event c, in the case that the event c occurs when the event a and the event b occur, the confidence degree of "a, b→c" supposed to be conf({a, b}, {c}) is as follows.

$$conf(\{a, b\}, \{c\}) = \frac{sup(\{a, b, c\})}{sup(\{a, b\})} \quad \text{[Equation 10]}$$

For example, in the example of the event set occurrence frequency list 1 file of FIG. 14 and the event set occurrence frequency list 2 file of FIG. 15, the case that the assumption event is "CROND" and the related event is "sshd: session closed" is considered. The support degree of "CROND" as the assumption event is 67% with reference to the event set occurrence frequency list 1 file. The support degree of the case that the both of "CROND" and "sshd: session closed" occur is 97% with reference to the event set occurrence frequency list 2 file. Therefore, the confidence degree of the case that the assumption event is "CROND" and the related event is "sshd: session closed" becomes 69%.
(Step S320)

The combination selecting section 33 checks the row of the event combination list, in which the confidence degree of the event combination list is equal to or more than the minimum confidence degree. For example, 0.8 or the like is set as the minimum confidence degree. Consequently, the event combination list file like FIGS. 19A and 19B is created.

The above is the description of the pattern selecting section 30 according to the exemplary embodiment of the present invention.

Next, the rule-making section 40 of the fault analysis rule extraction section 2 will be described. FIG. 20 is a flowchart of the rule-making section according to the exemplary embodiment of the present invention.

(Step S400)

The rule-making section 40 creates the fault analysis rule which can be processed by the fault analysis section 70, based on the causal relationship with the high checked confidence degree in the event combination list. An example of the fault analysis rule is the event correlation. For example, the rule is as follows. If the case that the event class A and the event class B occur continuously in a short time period arises many times, it is determined that these events occur by the same fault, and thus these events are unified into the event class A as the occurrence cause. This rule is described as, for example, "A→B", which means that the event B is derived from the event A as the cause. According to such a rule, the system manager does not require to analyze all event logs with uniform level. Therefore, the fault analysis becomes easier. For example, with reference to the twentieth row of FIGS. 19A and 19B, it is found that "sshd: session opened" and "sshd: Accepted publickey" occur as the assumption events, and "sshd: session closed" occurs as the related event. Since the confidence degree of the twentieth row of FIGS. 19A and 19B is 100%, the following can be considered in which the case that these events occur continuously arises many times. For example, the rule-making section 40 grasps that the relationship between event logs is "sshd: session opened", "sshd: Accepted publickey"→"sshd: session closed", as the fault analysis rule, which can be helpful to the fault analysis.

In the exemplary embodiment of the present invention, when the fault analysis rule relating event logs which can be deduced to occur by the same fault is created, the system manager does not require inputting the relationship between faults and event logs based on his/her experiences.

In addition, since the fault analysis rule is created every cluster into which similar event occurrence patterns are merged, the fault analysis rule in which another fault that event occurrence patterns are greatly different is a target is not created at the same time. Since properties of event occurrence patterns which can be detected as the fault analysis rule are averaged and are not overlooked, the accuracy of the fault analysis rule can be improved.

In addition, the fault analysis rule is created for the cluster in which the event set prepared by dividing and merging in each constant time period is cluster-analyzed as a target. Therefore, for the event by the fault with the low occurrence frequency, it has a high possibility to be able to create the fault analysis rule. That is, based on the timing of the fault occurrence, if the event set prepared by dividing and merging in each constant time period does not includes the events by the fault with low occurrence frequency and the events by the fault with high occurrence frequency, the fault analysis rule with high accuracy can be created for the events by the fault with low occurrence frequency.

The above is the description of the rule-making section 40 according to the exemplary embodiment of the present invention.

Next, the fault analysis section 70 will be described.

The fault analysis section 70 receives the event analysis rule file and the event log file as an input, and outputs the analysis result 102 based on the fault analysis rule. The analysis result 102 shows the manager that there is a high possibility that the event Ei of the event class a and the event Ej of the event class b occur from the same fault. For example, base on the information of the fault analysis rule, for the input event log, the event log file in which the events having the relationship of the assumption event and the related event are high-lighted is outputted. The manager can know that there is a high possibility that the event Ei and the event Ej occur from the same fault in a lot of the events, and can use it for estimating the fault cause.

(Supplementary Note 1)

A fault analysis rule extraction device including:

an event preprocessing section configured to create a set of event logs for an inputted event log file every certain time period with reference to event occurrence time in event logs, and perform a cluster analysis on the sets of event logs to classify a plurality of clusters; and a fault analysis rule extraction section configured to relate the event logs to each other in each of the plurality of clusters which is classified by the event preprocessing section, and output a fault analysis rule file indicating a fault analysis rule which relates event logs that can be presumed to occur from the same fault.

(Supplementary Note 2)

The fault analysis rule extraction device according to Supplementary note 1, wherein the fault analysis rule extraction section relates the event logs to each other by using a priori method.

(Supplementary Note 3)

The fault analysis rule extraction device according to Supplementary note 1 or 2, further including:

a fault analysis section configured to output an event log file indicating a relationship between event logs that can be presumed to occur from the same fault based on the fault analysis rule and the inputted event log file as input.

(Supplementary Note 4)

The fault analysis rule extraction device according to any of Supplementary notes 1 to 3, further including:

an input section; and a fault analysis rule correction section configured to correct the fault analysis rule file.

(Supplementary Note 5)

The fault analysis rule extraction device according to any of Supplementary notes 1 to 4, wherein the event preprocessing section includes:

a cluster list file in which data of a target of a cluster analysis is recorded, a time sequence grouping section configured to group event logs every certain time period to create the sets of event logs for the inputted event log file, with reference to the event occurrence time in the event logs, acquire the number of event occurrences for each event in each of the grouped sets of event logs, and record the number of event occurrences for each event in each of the grouped sets of event logs in the cluster list file, an inter-cluster dissimilarity list file in which distances between clusters are recorded, an inter-cluster dissimilarity calculating section configured to read the cluster list file, calculate distances between the grouped sets of event logs using a distance function for the grouped sets of event logs grouped by the time sequence grouping section, and record the distances between the grouped sets of event logs in the inter-cluster dissimilarity list file, a tree diagram file in which a new cluster, which is created by merging clusters, and the merged two clusters are recorded, a cluster analysis section configured to perform the cluster analysis on the sets of event logs with reference to the inter-cluster dissimilarity list file, record a relationship between a merging cluster and two merged clusters in the tree diagram file every time when clusters are merged in the process of the cluster analysis, and record the merging clusters in the cluster list file, an optimal cluster configuration selecting section configured to select an optimal cluster by using a cluster evaluation method for the merging clusters in the tree diagram file, a cluster configuration list file in which a classification result of the cluster analysis is recorded, and a cluster outputting section configured to acquire respective clusters and the sets of event logs included in the respective clusters by tracing the tree diagram file for the cluster selected by the optimal cluster configuration selecting section, and record a configuration of the entire clusters in the cluster configuration list file.

(Supplementary Note 6)

The fault analysis rule extraction device according to Supplementary note 2, wherein the fault analysis rule extraction section includes:

a frequency calculating section configured to calculate a support degree of an event of a priori method in each of the plurality of cluster classified by the event preprocessing section by dividing the number of the sets of event logs in which the event occurs in the cluster by the number of the sets of event logs which is included in the cluster.

(Supplementary Note 7)

A fault analysis rule extraction method which is executed by a fault analysis rule extraction device, the method including:

creating a set of event logs based on an inputted event log file every certain time period;

performing a cluster analysis on the sets of the event logs;

classifying the sets of event logs into a plurality of clusters;

relating the event logs to each other in each of the plurality of clusters; and outputting a fault analysis rule file indicating a fault analysis rule that relates the event logs that can be presumed to occur from the same fault based on the relating.

(Supplementary Note 8)

The fault analysis rule extraction method according to Supplementary note 7, wherein the step of relating uses a priori method for relating the event logs to each other.

(Supplementary Note 9)

The fault analysis rule extraction method according to Supplementary note 7 or 8, wherein the step of creating the set of event logs, includes:

storing a cluster list file in which data of a target of a cluster analysis is recorded in a storage medium, referring to occurrence time of the event logs for the inputted event log file, grouping event logs every certain time period based on the occurrence time of the event logs, acquiring the number of event occurrences for each event in each of the grouped sets of event logs, and recording the number of event occurrences for each event in each of the grouped sets of event logs in the cluster list file, wherein the step of classifying the sets of event logs into a plurality of clusters, includes:

storing an inter-cluster dissimilarity list file in which distances between clusters are recorded, a tree diagram file in which a new cluster, which is created by merging clusters, and the merged two clusters are recorded, and a cluster configuration list file in which a classification result of the cluster analysis is recorded, in a storage medium, reading the cluster list file calculating distances between the grouped sets of event logs using a distance function for the grouped sets of event logs grouped by the time sequence grouping section, recording the distances between the grouped sets of event logs in the inter-cluster dissimilarity list file, referring to the inter-cluster dissimilarity list file, performing the cluster analysis on the sets of event logs, recording a relationship between a merging cluster and two merged clusters in the tree diagram file every time when clusters are merged in the process of the cluster analysis, and recording the merging clusters in the cluster list file, selecting an optimal cluster by using a cluster evaluation method for the merging clusters in the tree diagram file, acquiring respective clusters and the sets of event logs included in the respective clusters by tracing the tree diagram file for the cluster selected by the optimal cluster configuration selecting section, and recording a configuration of the entire clusters in the cluster configuration list file.

(Supplementary Note 10)

The fault analysis rule extraction method according to Supplementary note 8, further including:

calculating a support degree of an event of a priori method in each of the plurality of cluster classified by the event preprocessing section by dividing the number of the sets of event logs in which the event occurs in the cluster by the number of the sets of event logs which is included in the cluster.

(Supplementary Note 11)

A storage medium in which a program is stored for a computer to execute a fault analysis rule extraction method according to any of Supplementary notes 7 to 10.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-054539 filed on Mar. 11, 2010, the disclosure of which is incorporated herein in its entirety by reference.

The invention claimed is:

1. A fault analysis rule extraction device comprising:
an event preprocessing section which is implemented by a hardware processor and which is configured to create a set of event logs for an inputted event log file every certain time period with reference to event occurrence time in event logs, and perform a cluster analysis on the sets of event logs to classify a plurality of clusters; and
a fault analysis rule extraction section which is implemented by a hardware processor and which is configured to relate the event logs to each other in each of the plurality of clusters which is classified by the event preprocessing section, and output a fault analysis rule file indicating a fault analysis rule which relates event logs that can be presumed to occur from the same fault,
wherein the event preprocessing section is further configured to create the set of event logs by:
storing a cluster list file in which data of a target of a cluster analysis is recorded in a storage medium,
referring to occurrence time of the event logs for the inputted event log file,
grouping event logs every certain time period based on the occurrence time of the event logs,
acquiring the number of event occurrences for each event in each of the grouped sets of event logs, and recording the number of event occurrences for each event in each of the grouped sets of event logs in the cluster list file, and wherein the event preprocessing section is further configured to perform the cluster analysis on the sets of event logs to classify the plurality of clusters by:

storing an inter-cluster dissimilarity list file in which distances between clusters are recorded, a tree diagram file in which a new cluster, which is created by merging clusters, and the merged two clusters are recorded, and a cluster configuration list file in which a classification result of the cluster analysis is recorded, in a storage medium, reading the cluster list file, calculating distances between the grouped sets of event logs using a distance function for the grouped sets of event logs, recording the distances between the grouped sets of event logs in the inter-cluster dissimilarity list file, referring to the inter-cluster dissimilarity list file, performing the cluster analysis on the sets of event logs, recording a relationship between a merging cluster and two merged clusters in the tree diagram file every time when clusters are merged in the process of the cluster analysis, and recording the merging clusters in the cluster list file, selecting an optimal cluster by using a cluster evaluation method for the merging clusters in the tree diagram file, acquiring respective clusters and the sets of event logs included in the respective clusters by tracing the tree diagram file for the cluster, and recording a configuration of the entire clusters in the cluster configuration list file.

2. The fault analysis rule extraction device according to claim 1, wherein the fault analysis rule extraction section relates the event logs to each other by using a priori method.

3. The fault analysis rule extraction device according to claim 2, wherein the fault analysis rule extraction section includes:

a frequency calculating section configured to calculate a support degree of an event of a priori method in each of the plurality of cluster classified by the event preprocessing section by dividing the number of the sets of event logs in which the event occurs in the cluster by the number of the sets of event logs which is included in the cluster.

4. The fault analysis rule extraction device according to claim 1, further including:

a fault analysis section configured to output an event log file indicating a relationship between event logs that can be presumed to occur from the same fault based on the fault analysis rule and the inputted event log file as input.

5. The fault analysis rule extraction device according to claim 1, further including:

an input section; and a fault analysis rule correction section configured to correct the fault analysis rule file.

6. The fault analysis rule extraction device according to claim 1, wherein the event preprocessing section includes:

a cluster list file in which data of a target of a cluster analysis is recorded, a time sequence grouping section configured to group event logs every certain time period to create the sets of event logs for the inputted event log file, with reference to the event occurrence time in the event logs, acquire the number of event occurrences for each event in each of the grouped sets of event logs, and record the number of event occurrences for each event in each of the grouped sets of event logs in the cluster list file, an inter-cluster dissimilarity list file in which distances between clusters are recorded, an inter-cluster dissimilarity calculating section configured to read the cluster list file, calculate distances between the grouped sets of event logs using a distance function for the grouped sets of event logs grouped by the time sequence grouping section, and record the distances between the grouped sets of event logs in the inter-cluster dissimilarity list file, a tree diagram file in which a new cluster, which is created by merging clusters, and the merged two clusters are recorded, a cluster analysis section configured to perform the cluster analysis on the sets of event logs with reference to the inter-cluster dissimilarity list file, record a relationship between a merging cluster and two merged clusters in the tree diagram file every time when clusters are merged in the process of the cluster analysis, and record the merging clusters in the cluster list file, an optimal cluster configuration selecting section configured to select an optimal cluster by using a cluster evaluation method for the merging clusters in the tree diagram file, a cluster configuration list file in which a classification result of the cluster analysis is recorded, and a cluster outputting section configured to acquire respective clusters and the sets of event logs included in the respective clusters by tracing the tree diagram file for the cluster selected by the optimal cluster configuration selecting section, and record a configuration of the entire clusters in the cluster configuration list file.

7. The fault analysis rule extraction device according to claim 3, wherein the event preprocessing section includes:

a cluster list file in which data of a target of a cluster analysis is recorded, a time sequence grouping section configured to group event logs every certain time period to create the sets of event logs for the inputted event log file, with reference to the event occurrence time in the event logs, acquire the number of event occurrences for each event in each of the grouped sets of event logs, and record the number of event occurrences for each event in each of the grouped sets of event logs in the cluster list file, an inter-cluster dissimilarity list file in which distances between clusters are recorded, an inter-cluster dissimilarity calculating section configured to read the cluster list file, calculate distances between the grouped sets of event logs using a distance function for the grouped sets of event logs grouped by the time sequence grouping section, and record the distances between the grouped sets of event logs in the inter-cluster dissimilarity list file, a tree diagram file in which a new cluster, which is created by merging clusters, and the merged two clusters are recorded, a cluster analysis section configured to perform the cluster analysis on the sets of event logs with reference to the inter-cluster dissimilarity list file, record a relationship between a merging cluster and two merged clusters in the tree diagram file every time when clusters are merged in the process of the cluster analysis, and record the merging clusters in the cluster list file, an optimal cluster configuration selecting section configured to select an optimal cluster by using a cluster evaluation method for the merging clusters in the tree diagram file, a cluster configuration list file in which a classification result of the cluster analysis is recorded, and a cluster outputting section configured to acquire respective clusters and the sets of event logs included in the respective clusters by tracing the tree diagram file for the cluster selected by the optimal cluster configuration selecting section, and record a configuration of the entire clusters in the cluster configuration list file.

8. The fault analysis rule extraction device according to claim 7, further including:

a fault analysis section configured to output an event log file indicating a relationship between event logs that can be presumed to occur from the same fault based on the fault analysis rule and the inputted event log file as input.

9. A fault analysis rule extraction method which is executed by a fault analysis rule extraction device, the method comprising:

creating a set of event logs based on an inputted event log file every certain time period;

performing a cluster analysis on the sets of the event logs;

classifying the sets of event logs into a plurality of clusters;

relating the event logs to each other in each of the plurality of clusters; and outputting a fault analysis rule file indicating a fault analysis rule that relates the event logs that can be presumed to occur from the same fault based on the relating, wherein the step of creating the set of event logs, includes:

storing a cluster list file in which data of a target of a cluster analysis is recorded in a storage medium, referring to occurrence time of the event logs for the inputted event log file, grouping event logs every certain time period based on the occurrence time of the event logs, acquiring the number of event occurrences for each event in each of the grouped sets of event logs, and recording the number of event occurrences for each event in each of the grouped sets of event logs in the cluster list file, wherein the step of classifying the sets of event logs into a plurality of clusters, includes:

storing an inter-cluster dissimilarity list file in which distances between clusters are recorded, a tree diagram file in which a new cluster, which is created by merging clusters, and the merged two clusters are recorded, and a cluster configuration list file in which a classification result of the cluster analysis is recorded, in a storage medium, reading the cluster list file, calculating distances between the grouped sets of event logs using a distance function for the grouped sets of event logs, recording the distances between the grouped sets of event logs in the inter-cluster dissimilarity list file, referring to the inter-cluster dissimilarity list file, performing the cluster analysis on the sets of event logs, recording a relationship between a merging cluster and two merged clusters in the tree diagram file every time when clusters are merged in the process of the cluster analysis, and recording the merging clusters in the cluster list file, selecting an optimal cluster by using a cluster evaluation method for the merging clusters in the tree diagram file, acquiring respective clusters and the sets of event logs included in the respective clusters by tracing the tree diagram file for the cluster, and recording a configuration of the entire clusters in the cluster configuration list file.

10. The fault analysis rule extraction method according to claim 9 wherein the step of relating uses a priori method for relating the event logs to each other.

11. The fault analysis rule extraction method according to claim 9, further comprising:

calculating a support degree of an event of a priori method in each of the plurality of cluster classified by the event preprocessing section by dividing the number of the sets of event logs in which the event occurs in the cluster by the number of the sets of event logs which is included in the cluster.

12. A non-transitory computer-readable storage medium in which a computer-readable program code is stored for a computer to execute a fault analysis rule extraction method, the method comprising:

creating a set of event logs based on an inputted event log file every certain time period;

performing a cluster analysis on the sets of the event logs;

classifying the sets of event logs into a plurality of clusters;

relating the event logs to each other in each of the plurality of clusters; and outputting a fault analysis rule file indicating a fault analysis rule that relates the event logs that can be presumed to occur from the same fault based on the relating, wherein the step of creating the set of event logs includes:

storing a cluster list file in which data of a target of a cluster analysis is recorded in a storage medium, referring to occurrence time of the event logs for the inputted event log file, grouping event logs every certain time period based on the occurrence time of the event logs, acquiring the number of event occurrences for each event in each of the grouped sets of event logs, and recording the number of event occurrences for each event in each of the grouped sets of event logs in the cluster list file, wherein the step of classifying the sets of event logs into a plurality of clusters includes:

storing an inter-cluster dissimilarity list file in which distances between clusters are recorded, a tree diagram file in which a new cluster, which is created by merging clusters, and the merged two clusters are recorded, and a cluster configuration list file in which a classification result of the cluster analysis is recorded, in a storage medium, reading the cluster list file, calculating distances between the grouped sets of event logs using a distance function for the grouped sets of event logs, recording the distances between the grouped sets of event logs in the inter-cluster dissimilarity list file, referring to the inter-cluster dissimilarity list file, performing the cluster analysis on the sets of event logs, recording a relationship between a merging cluster and two merged clusters in the tree diagram file every time when clusters are merged in the process of the cluster analysis, and recording the merging clusters in the cluster list file, selecting an optimal cluster by using a cluster evaluation method for the merging clusters in the tree diagram file, acquiring respective clusters and the sets of event logs included in the respective clusters by tracing the tree diagram file for the cluster, and recording a configuration of the entire clusters in the cluster configuration list file.

13. The non-transitory computer-readable storage medium according to claim 12, wherein the step of relating uses a priori method for relating the event logs to each other.

14. The non-transitory computer-readable storage medium according to claim 12, the method further comprising:
   calculating a support degree of an event of a priori method in each of the plurality of cluster classified by the event preprocessing section by dividing the number of the sets of event logs in which the event occurs in the cluster by the number of the sets of event logs which is included in the cluster.

* * * * *